United States Patent
Aneja et al.

(10) Patent No.: US 12,466,415 B2
(45) Date of Patent: Nov. 11, 2025

(54) DOMAIN ISOLATION IN AN AUTOMOTIVE AUTOMATED DRIVING SYSTEM

(71) Applicant: QUALCOMM Incorporated, San Diego, CA (US)

(72) Inventors: Amit Aneja, Chandler, AZ (US); Rahul Gulati, San Diego, CA (US); Sriram Hariharan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 301 days.

(21) Appl. No.: 18/309,206

(22) Filed: Apr. 28, 2023

(65) Prior Publication Data

US 2024/0359698 A1    Oct. 31, 2024

(51) Int. Cl.
*B60W 50/04*    (2006.01)
*B60W 60/00*    (2020.01)
*G06F 8/65*    (2018.01)
*B60W 50/00*    (2006.01)

(52) U.S. Cl.
CPC .......... *B60W 50/04* (2013.01); *B60W 60/001* (2020.02); *G06F 8/65* (2013.01); *B60W 2050/0016* (2013.01)

(58) Field of Classification Search
CPC ........................... B60W 50/04; B60W 60/001
See application file for complete search history.

(56) References Cited

U.S. PATENT DOCUMENTS

| | | | |
|---|---|---|---|
| 11,416,298 B1* | 8/2022 | Barker, Jr. | G06F 3/061 |
| 2019/0180526 A1* | 6/2019 | Mehdizade | G05D 1/0088 |
| 2019/0258251 A1* | 8/2019 | Ditty | G05D 1/0274 |
| 2020/0039530 A1* | 2/2020 | Smolyansky | B60W 50/0225 |
| 2020/0148218 A1* | 5/2020 | Huang | G06F 11/165 |
| 2020/0264945 A1* | 8/2020 | Gangopadhyay | G06F 11/0739 |
| 2021/0200533 A1* | 7/2021 | Gage | G06F 8/71 |
| 2021/0208189 A1 | 7/2021 | Flores et al. | |
| 2022/0234634 A1* | 7/2022 | Beach | B61L 25/025 |
| 2022/0278870 A1 | 9/2022 | Suzuki et al. | |
| 2023/0032305 A1* | 2/2023 | Krishnani | G06F 11/0772 |
| 2023/0036130 A1* | 2/2023 | Ditty | H03M 13/09 |
| 2023/0359520 A1* | 11/2023 | Edamadaka | H04L 67/10 |
| 2024/0103919 A1* | 3/2024 | Karr | G06F 16/00 |
| 2024/0300537 A1* | 9/2024 | Krishnani | G06F 15/7807 |

OTHER PUBLICATIONS

International Search Report and Written Opinion—PCT/US2024/018530—ISA/EPO—Jul. 5, 2024 (2303573WO).

* cited by examiner

*Primary Examiner* — Jess Whittington
(74) *Attorney, Agent, or Firm* — Norton, Rose, Fulbright US LLP

(57) ABSTRACT

This disclosure provides systems, methods, and devices for vehicles with automated driving systems. In a first aspect, a method of isolation in an automated driving system includes detecting the error in a first domain of the automated driving system, isolating a second domain of the automated driving system from the first domain, maintaining operation of the second domain after isolating the second domain from the first domain, and bypassing, by the second domain, the first domain to transmit notifications to an external controller via a first communication interface. Other aspects and features are also claimed and described.

27 Claims, 10 Drawing Sheets

DOMAIN ISOLATION IN AN AUTOMOTIVE AUTOMATED DRIVING SYSTEM

TECHNICAL FIELD

Aspects of the present disclosure relate generally to vehicles with automated driving systems, and more particularly, to methods and systems suitable for supplying domain isolation in an automated driving system.

INTRODUCTION

Vehicles take many shapes and sizes, are propelled by a variety of propulsion techniques, and carry cargo including humans, animals, or objects. These machines have enabled the movement of cargo across long distances, movement of cargo at high speed, and movement of cargo that is larger than could be moved by human exertion. Vehicles originally were driven by humans to control speed and direction of the cargo to arrive at a destination. Human operation of vehicles has led to many unfortunate incidents resulting from the collision of vehicle with vehicle, vehicle with object, vehicle with human, or vehicle with animal. As research into vehicle automation has progressed, a variety of automated driving systems have been produced and introduced. These include navigation directions by GPS, adaptive cruise control, lane change assistance, collision avoidance systems, night vision, parking assistance, blind spot detection, lane keeping assistance, automated braking, and even full autonomous driving.

As automated driving systems have progressed, so too have requirements for computing capacity to support such automated driving systems. Vehicles may include multiple computing systems, which may be general-purpose or tailored to specific automated driving functions. Furthermore, such computing systems may be designed to meet varying safety standards, depending on the features supported by such computing systems.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Human operators of vehicles can be distracted, which is one factor in many vehicle crashes. Driver distractions can include changing the radio, observing an event outside the vehicle, and using an electronic device, etc. Sometimes circumstances create situations that even attentive drivers are unable to identify in time to prevent vehicular collisions. Aspects of this disclosure, provide improved systems for assisting drivers in vehicles with enhanced situational awareness and/or autonomous driving capabilities.

Example embodiments provide isolation between domains of an automotive system on a chip (SOC) of an automated driving system, such as an assisted or autonomous driving system, to facilitate continued operation of a second domain of the SOC when a first domain of the SOC encounters an error. For example, an error may be detected in a first domain of the SOC, and a second domain of the SOC may be isolated from the first domain in response to the detected error. Such isolation may allow for operation of the second domain of the SOC to be maintained, even when the first domain becomes inoperable due to the error. Furthermore, the second domain, which may communicate with an external controller of the automated driving system via the first domain when the second domain is not isolated from the first domain, may bypass the first domain and may communicate with the external controller via a first communication interface when the second domain is isolated from the first domain. Isolation of the second domain from the first domain and continued communication between the second domain and the external controller may allow the second domain to continue operation in a degraded mode, enabling the second domain to control the vehicle to, for example, stop safely and shut down or recover from the error in the first domain and deactivate the isolation between the first and second domain.

In one aspect of the disclosure, a method for domain isolation in an automated driving system includes detecting an error in a first domain of the automated driving system, isolating a second domain of the automated driving system from the first domain, maintaining operation of the second domain of the automated driving system after isolating the second domain from the first domain, and bypassing, by the second domain, the first domain to transmit one or more notifications to an external controller via a first communication interface between the second domain and the external controller after isolating the second domain of the automated driving system from the first domain.

In an additional aspect of the disclosure, an apparatus includes at least one processor and a memory coupled to the at least one processor. The at least one processor is configured to perform operations including detecting an error in a first domain of the automated driving system, wherein the automated driving system includes the processor, isolating a second domain of the automated driving system from the first domain, maintaining operation of the second domain of the automated driving system after isolating the second domain from the first domain, and bypassing, by the second domain, the first domain to transmit one or more notifications to an external controller via a first communication interface between the second domain and the external controller after isolating the second domain of the automated driving system from the first domain.

In an additional aspect of the disclosure, an apparatus includes means for receiving image data from an image sensor, means for detecting an error in a first domain of an automated driving system, wherein the automated driving system includes the processor; means for isolating a second domain of the automated driving system from the first domain; means for maintaining operation of the second domain of the automated driving system after isolating the second domain from the first domain, and means for bypassing, by the second domain, the first domain to transmit one or more notifications to an external controller via a first communication interface between the second domain and the external controller after isolating the second domain of the automated driving system from the first domain In an additional aspect of the disclosure, a non-transitory computer-readable medium stores instructions that, when executed by a processor, cause the processor to perform operations. The operations include detecting an error in a first domain of an automated driving system, wherein the automated driving system includes the processor, isolating a second domain of the automated driving system from the first domain, maintaining operation of the second domain of the automated driving system after isolating the second domain from the first domain, and bypassing, by the second domain, the first domain to transmit one or more notifications to an external controller via a first communication interface between the second domain and the external controller after isolating the second domain of the automated driving system from the first domain.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) ng networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). 5G networks include diverse deployments, diverse spectrum, and diverse services and devices that may be implemented using an OFDM-based unified, air interface.

The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHZ-7.125 GHZ) and FR2 (24.25 GHZ-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHZ-300 GHz) which is identified by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHZ, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHZ bandwidth.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur.

Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support domain isolation in an automotive SOC. Example embodiments provide isolation, such as two-way isolation, between domains of an automotive system on a chip (SOC) to facilitate degraded operation of a second domain when a first domain encounters an error. For example, automotive SOCs for providing automated driving functionality, such as assisted or autonomous driving capabilities, may be divided into different domains configured to meet different safety standards, such as into safety island (SAIL) and main domains. Dual isolation between domains of automotive SOCs may allow a domain that has not encountered an error to continue to operate even when another domain has encountered an error that is not correctable. To facilitate such operation, a second domain, such as a main domain, may bypass a first domain, such as a SAIL, to communicate with an external controller, such as a microcontroller or electronic control unit (ECU), and maintain operational continuity of the second domain when the first domain is deactivated, as, when both domains are activated, the second domain may communicate with the external controller only through the first domain.

Particular implementations of the subject matter described in this disclosure may be implemented to realize one or more of the following potential advantages or benefits. In some aspects, the present disclosure provides techniques for domain isolation that may be particularly beneficial in smart vehicle applications. For example, the operational continuity described herein may, allow time for a vehicle assistance SOC to recover from an error that is limited to one domain, or, if the error is not correctable, may allow a vehicle with assisted or autonomous driving capabilities to perform minimum risk maneuver (MRM) procedures and/or other graceful shutdown procedures. For example, if a SAIL domain of a automated driving SOC, such as an autonomous driving or assisted driving SOC, fails, continued operation of a main domain of the SOC in a degraded mode, without assistance from the SAIL domain, may allow the vehicle to safely pull over to the roadside and shut down.

Figure 1:
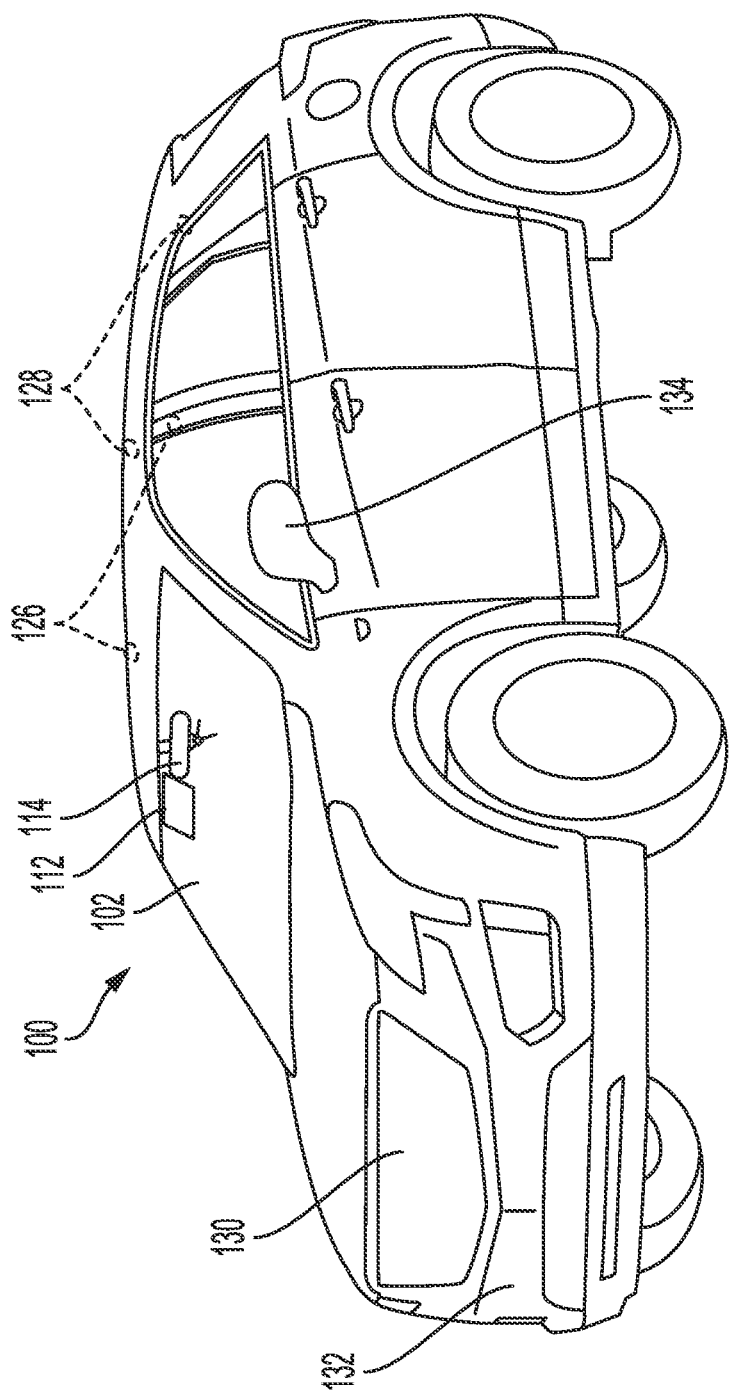
FIG. 1 is a perspective view of a motor vehicle with a automated driving system according to embodiments of this disclosure.

FIG. 1 is a perspective view of a motor vehicle with a driver assistance system according to embodiments of this disclosure. A vehicle 100 may include multiple sensors, such as a front-facing camera 112 mounted inside the cabin looking through the windshield 102. The vehicle may also include a cabin-facing camera 114 mounted inside the cabin looking towards occupants of the vehicle 100, and in particular the driver of the vehicle 100. Although one set of mounting positions for cameras 112 and 114 are shown for vehicle 100, other mounting locations may be used for the cameras 112 and 114. For example, one or more cameras may be mounted on one of the driver or passenger B pillars 126 or one of the driver or passenger C pillars 128, such as near the top of the pillars 126 or 128. As another example, one or more cameras may be mounted at the front of vehicle 100, such as behind the radiator grill 130 or integrated with bumper 132. As a further example, one or more cameras may be mounted as part of a driver or passenger side mirror assembly 134.

The camera 112 may be oriented such that the field of view of camera 112 captures a scene in front of the vehicle 100 in the direction that the vehicle 100 is moving when in drive mode or forward direction. In some embodiments, an additional camera may be located at the rear of the vehicle 100 and oriented such that the field of view of the additional camera captures a scene behind the vehicle 100 in the direction that the vehicle 100 is moving when in reverse direction. Although embodiments of the disclosure may be described with reference to a "front-facing" camera, referring to camera 112, aspects of the disclosure may be applied similarly to a "rear-facing" camera facing in the reverse direction of the vehicle 100. Thus, the benefits obtained while the operator is driving the vehicle 100 in a forward direction may likewise be obtained while the operator is driving the vehicle 100 in a reverse direction.

Further, although embodiments of the disclosure may be described with reference a "front-facing" camera, referring to camera 112, aspects of the disclosure may be applied similarly to an input received from an array of cameras mounted around the vehicle 100 to provide a larger field of view, which may be as large as 360 degrees around parallel to the ground and/or as large as 360 degrees around a vertical direction perpendicular to the ground. For example, additional cameras may be mounted around the outside of vehicle 100, such as on or integrated in the doors, on or integrated in the wheels, on or integrated in the bumpers, on or integrated in the hood, and/or on or integrated in the roof.

The camera 114 may be oriented such that the field of view of camera 114 captures a scene in the cabin of the vehicle and includes the user operator of the vehicle, and in particular the face of the user operator of the vehicle with sufficient detail to discern a gaze direction of the user operator.

Each of the cameras 112 and 114 may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a telephoto image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur in a camera module with a lens cluster, in which the multiple image sensors and associated lenses are located in offset locations within the camera module. Additional image sensors may be included with larger, smaller, or same fields of view.

Each image sensor may include means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), and/or time of flight detectors. The apparatus may further include one or more means for accumulating and/or focusing light rays into the one or more image sensors (including simple lenses, compound lenses, spherical lenses, and non-spherical lenses). These components may be controlled to capture the first, second, and/or more image frames. The image frames may be processed to form a single output image frame, such as through a fusion operation, and that output image frame further processed according to the aspects described herein.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

The camera(s) of FIG. 1 may, along with other sensors, such as radar sensors, lidar sensors, and other sensors, provide sensed information to an assisted driving SOC of the vehicle 100. The assisted driving SOC may use the data for providing assisted or autonomous driving capabilities. In particular, the assisted driving SOC may receive data from one or more sensors of the vehicle 100 and may control one or more functions of the vehicle based on the received data, such as acceleration, braking, steering, blinker activation, headlight activation, wiper activation, and other functions. For example, the assisted driving SOC may provide assisted driving capabilities of up to, and exceeding, level 4 autonomous driving capabilities.

Figure 2:
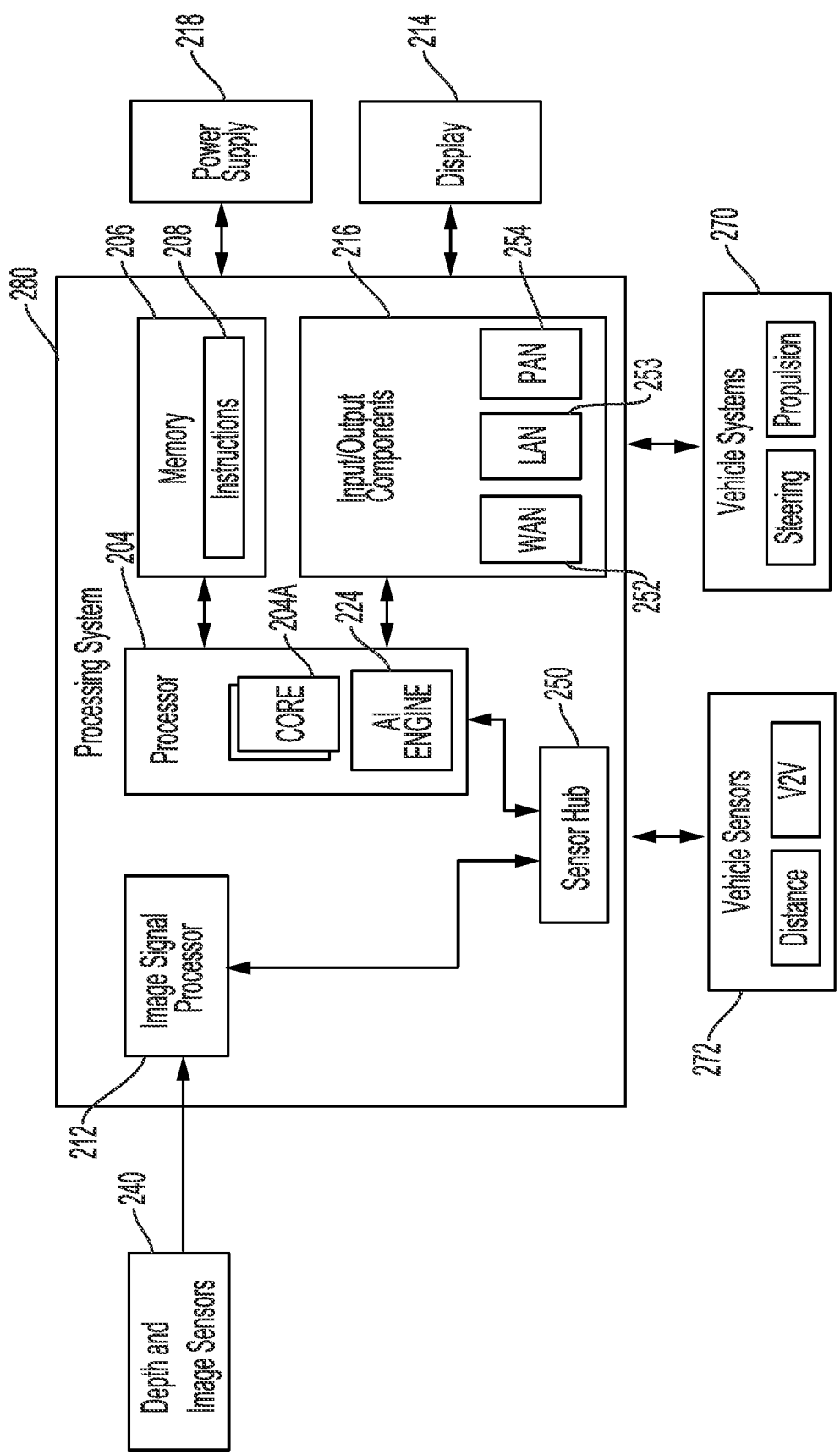
FIG. 2 shows a block diagram of an example automated driving SoC for a vehicle according to one or more aspects of the disclosure.

FIG. 2 shows a block diagram of an example assisted driving processing configuration for a vehicle according to one or more aspects of the disclosure. For example, the driving assistance system of FIG. 2 may include a processing system, such as a SOC for providing automated driving as described herein. The vehicle 100 may include, or otherwise be coupled to, an image signal processor 212 for processing image frames from one or more image sensors, such as depth and image sensors 240. In some implementations, the vehicle 100 also includes or is coupled to a processor (e.g., CPU) 204 and a memory 206 storing instructions 208. In some embodiments, the processor 204 may include one or more neural signal processors, one or more graphics processing units (GPUs), one or more application processors, one or more computer vision processors, and one or more other processing units. The device 100 may also include or be coupled to a display 214 and input/output (I/O) components 216. I/O components 216 may be used for interacting with a user, such as a touch screen interface and/or physical buttons. I/O components 216 may also include network interfaces for communicating with other devices, such as other vehicles, an operator's mobile devices, and/or a remote monitoring system. The network interfaces may include one or more of a wide area network (WAN) adaptor 252, a local area network (LAN) adaptor 253, and/or a personal area network (PAN) adaptor 254. An example WAN adaptor 252 is a 4G LTE or a 5G NR wireless network adaptor. An example LAN adaptor 253 is an IEEE 802.11 WiFi wireless network adapter. An example PAN adaptor 254 is a Bluetooth wireless network adaptor. Each of the adaptors 252, 253, and/or 254 may be coupled to an antenna, including multiple antennas configured for primary and diversity reception and/or configured for receiving specific frequency bands. The vehicle 100 may further include or be coupled to a power supply 218, such as a battery or an alternator. The vehicle 100 may also include or be coupled to additional features or components that are not shown in FIG. 2. In one example, a wireless interface, which may include one or more transceivers and associated baseband processors, may be coupled to or included in WAN adaptor 252 for a wireless communication device. In a further example, an analog front end (AFE) to convert analog image frame data to digital image frame data may be coupled between the image sensors 201 and 202 and the image signal processor 212.

The vehicle 100 may include a sensor hub 250 for interfacing with sensors to receive data regarding movement of the vehicle 100, data regarding an environment around the vehicle 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In further examples, a non-camera sensor may be a global positioning system (GPS) receiver, a light detection and ranging (LiDAR) system, a radio detection and ranging (RADAR) system, or other ranging systems. For example, the sensor hub 250 may interface to a vehicle bus for sending configuration commands and/or receiving information from vehicle sensors 272, such as distance (e.g., ranging) sensors or vehicle-to-vehicle (V2V) sensors (e.g., sensors for receiving information from nearby vehicles).

The image signal processor (ISP) 212 may receive image data, such as used to form image frames. In one embodiment, a local bus connection couples the image signal processor 212 to depth and image sensors 240, which may correspond to camera 112 of FIG. 1, and second camera 205, which may correspond to camera 114 of FIG. 1. In another embodiment, a wire interface may couple the image signal processor 212 to an external image sensor. In a further embodiment, a wireless interface may couple the image signal processor 212 to depth and image sensors 240.

In some implementations, the memory 206 may include a non-transient or non-transitory computer readable medium storing computer-executable instructions 208 to perform all or a portion of one or more operations described in this disclosure. In some implementations, the instructions 208 include a camera application (or other suitable application) to be executed during operation of the vehicle 100 for generating images or videos. The instructions 208 may also include other applications or programs executed for the vehicle 100, such as an operating system, automated driving applications, mapping applications, or entertainment applications. Execution of the camera application, such as by the processor 204, may cause the vehicle 100 to generate images using the depth and image sensors 240 and the image signal processor 212. The memory 206 may also be accessed by the image signal processor 212 to store processed frames or may be accessed by the processor 204 to obtain the processed frames. In some embodiments, the vehicle 100 includes a system on chip (SoC) that incorporates the image signal processor 212, the processor 204, the sensor hub 250, the memory 206, and input/output components 216 into a single package.

In some embodiments, at least one of the image signal processor 212 or the processor 204 executes instructions to perform various operations described herein, including object detection, risk map generation, driver monitoring, autonomous or assisted driving, and driver alert operations. For example, execution of the instructions can instruct the processing system to isolate one or more domains of the processing system 280, upon detection of a fault or error in another domain, as described herein. In some embodiments, the processor 204 may include one or more general-purpose processor cores 204A capable of executing scripts or instructions of one or more software programs, such as instructions 208 stored within the memory 206. For example, the processor 204 may include one or more application processors configured to execute the camera application (or other suitable application for generating images or video) stored in the memory 206.

In some embodiments, the processor 204 may include ICs or other hardware (e.g., an artificial intelligence (AI) engine 224) in addition to the ability to execute software to cause the vehicle 100 to perform a number of functions or operations, such as the operations described herein. In some other embodiments, the vehicle 100 does not include the processor 204, such as when all of the described functionality is configured in the image signal processor 212. In some embodiments, the processing system 280 including the processor 204, the image signal processor 212, the sensor hub 250, the input/output components 216 and the memory 206 may be integrated in one or more SOCs, such as a automated driving SOC. Such an SOC may, for example, include multiple processors 204, one or more image signal processors 212, and other components. The SOC may also include one or more neural signal processing units, one or more graphics processing units (GPUs), one or more application processors, one or more computer vision processors, one or more display processors, one or more peripheral interfaces, such as ethernet, universal serial bus, or other interfaces, one or more sensors and/or sensor interfaces, one or more voltage supplies, one or more clock, one or more memory controllers such as one or more oscillators, and other components. In some embodiments, the processing system 280 may include one or more busses connecting components, such as the processor 204, the memory 206, and other components of the processing system 280. In some embodiments, the processing system 280 may include multiple processors and may be divided into multiple domains, as described herein. For example, multiple domains of the processing system may be configured to meet different safety standards, as described herein.

In some embodiments, the display 214 may include one or more suitable displays or screens allowing for user interaction and/or to present items to the user. In some embodiments, the display 214 is a touch-sensitive display. The I/O components 216 may be or include any suitable mechanism, interface, or device to receive input (such as commands) from the user and to provide output to the user through the display 214. For example, the I/O components 216 may include (but are not limited to) a graphical user interface (GUI), a keyboard, a mouse, a microphone, speakers, a squeezable bezel, one or more buttons (such as a power button), a slider, a switch, and so on. In some embodiments involving autonomous driving, the I/O components 216 may include an interface to a vehicle's bus for providing commands and information to and receiving information from vehicle systems 270 including propulsion (e.g., commands to increase or decrease speed or apply brakes) and steering systems (e.g., commands to turn wheels, change a route, or change a final destination).

While shown to be coupled to each other via the processor 204, components (such as the processor 204, the memory 206, the image signal processor 212, the display 214, and the I/O components 216) may be coupled to each another in other various arrangements, such as via one or more local buses, which are not shown for simplicity. While the image signal processor 212 is illustrated as separate from the processor 204, the image signal processor 212 may be a core of a processor 204 that is an application processor unit (APU), included in a system on chip (SoC), or otherwise included with the processor 204. While the vehicle 100 is referred to in the examples herein for including aspects of the present disclosure, some device components may not be shown in FIG. 2 to prevent obscuring aspects of the present disclosure. Additionally, other components, numbers of components, or combinations of components may be included in a suitable vehicle for performing aspects of the present disclosure. As such, the present disclosure is not limited to a specific device or configuration of components, including the vehicle 100.

Figure 3:
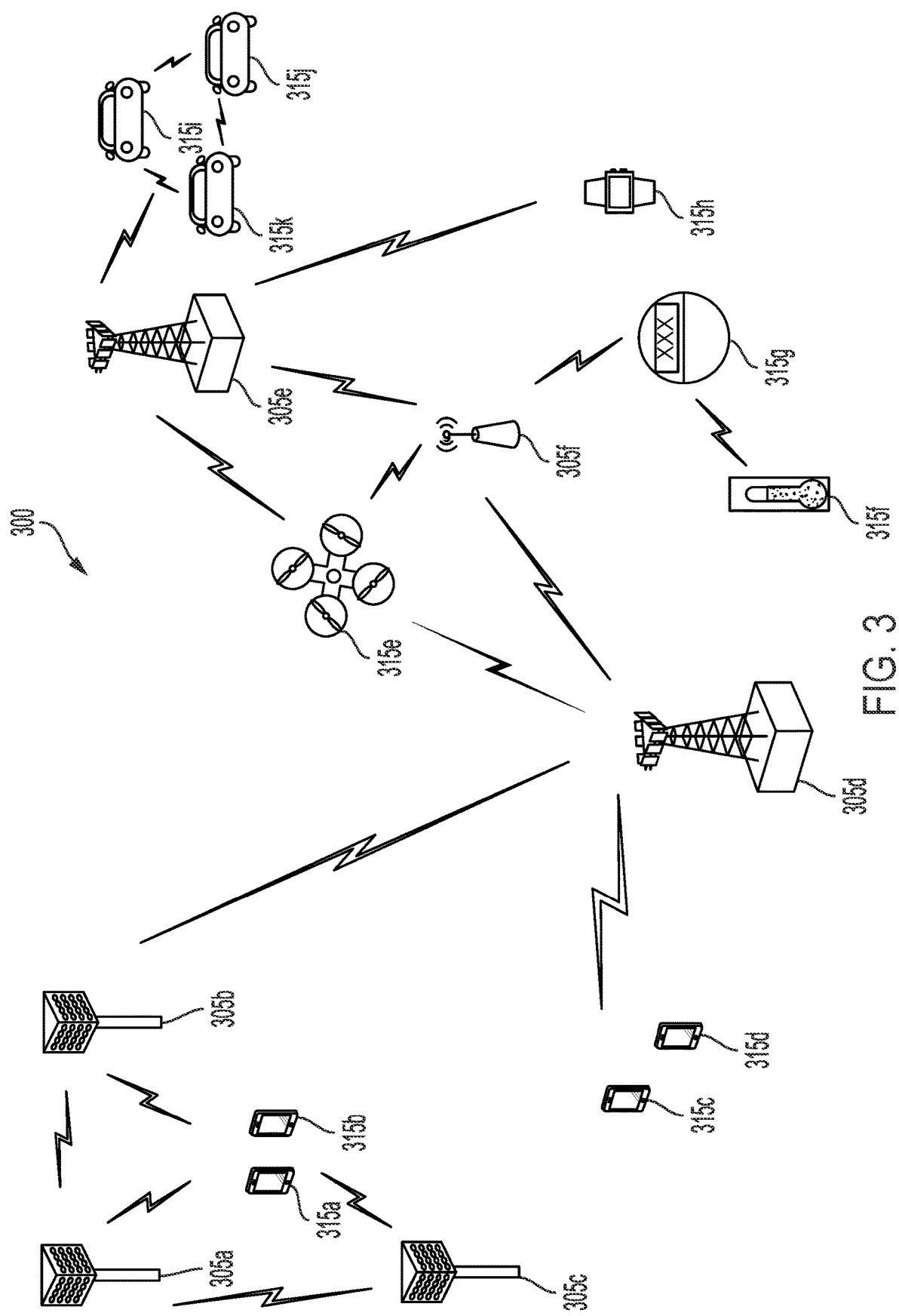
FIG. 3 is a block diagram illustrating details of an example wireless communication system according to one or more aspects.

The vehicle 100 may communicate as a user equipment (UE) within a wireless network 300, such as through WAN adaptor 252, as shown in FIG. 3. FIG. 3 is a block diagram illustrating details of an example wireless communication system according to one or more aspects. Wireless network 300 may, for example, include a 5G wireless network. As appreciated by those skilled in the art, components appearing in FIG. 3 are likely to have related counterparts in other network arrangements including, for example, cellular-style network arrangements and non-cellular-style-network arrangements (e.g., device-to-device or peer-to-peer or ad-hoc network arrangements, etc.).

Wireless network 300 illustrated in FIG. 3 includes base stations 305 and other network entities. A base station may be a station that communicates with the UEs and may also be referred to as an evolved node B (eNB), a next generation eNB (gNB), an access point, and the like. Each base station 305 may provide communication coverage for a particular geographic area. In 3GPP, the term "cell" may refer to this particular geographic coverage area of a base station or a base station subsystem serving the coverage area, depending on the context in which the term is used. In implementations of wireless network 300 herein, base stations 305 may be associated with a same operator or different operators (e.g., wireless network 300 may include a plurality of operator wireless networks). Additionally, in implementations of wireless network 300 herein, base station 305 may provide wireless communications using one or more of the same frequencies (e.g., one or more frequency bands in licensed spectrum, unlicensed spectrum, or a combination thereof) as a neighboring cell. In some examples, an individual base station 305 or UE 315 may be operated by more than one network operating entity. In some other examples, each base station 305 and UE 315 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 3, base stations 305d and 305e are regular macro base stations, while base stations 305a-305c are macro base stations enabled with one of three-dimension (3D), full dimension (FD), or massive MIMO. Base stations 305a-305c take advantage of their higher dimension MIMO capabilities to exploit 3D beamforming in both elevation and azimuth beamforming to increase coverage and capacity. Base station 305f is a small cell base station which may be a home node or portable access point. A base station may support one or multiple (e.g., two, three, four, and the like) cells.

Wireless network 300 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 315 are dispersed throughout the wireless network 300, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology.

Some non-limiting examples of a mobile apparatus, such as may include implementations of one or more of UEs 315, include a mobile, a cellular (cell) phone, a smart phone, a session initiation protocol (SIP) phone, a wireless local loop (WLL) station, a laptop, a personal computer (PC), a notebook, a netbook, a smart book, a tablet, a personal digital assistant (PDA), and a vehicle. Although UEs 315a-j are specifically shown as vehicles, a vehicle may employ the communication configuration described with reference to any of the UEs 315a-315k.

In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 315a-315d of the implementation illustrated in FIG. 3 are examples of mobile smart phone-type devices accessing wireless network 300. A UE may also be a machine specifically configured for connected communication, including machine type communication (MTC), enhanced MTC (eMTC), narrowband IoT (NB-IoT) and the like. UEs 315c-315k illustrated in FIG. 3 are examples of various machines configured for communication that access wireless network 300.

A mobile apparatus, such as UEs 315, may be able to communicate with any type of the base stations, whether macro base stations, pico base stations, femto base stations, relays, and the like. In FIG. 3, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 300 may occur using wired or wireless communication links.

In operation at wireless network 300, base stations 305a-305c serve UEs 315a and 315b using 3D beamforming and coordinated spatial techniques, such as coordinated multipoint (CoMP) or multi-connectivity. Macro base station 305d performs backhaul communications with base stations 305a-305c, as well as small cell, base station 305f. Macro base station 305d also transmits multicast services which are subscribed to and received by UEs 315c and 315d. Such multicast services may include mobile television or stream video, or may include other services for providing community information, such as weather emergencies or alerts, such as Amber alerts or gray alerts.

Wireless network 300 of implementations supports mission critical communications with ultra-reliable and redundant links for mission critical devices, such UE 315e, which is a drone. Redundant communication links with UE 315e include from macro base stations 305d and 305e, as well as small cell base station 305f. Other machine type devices, such as UE 315f (thermometer), UE 315g (smart meter), and UE 315h (wearable device) may communicate through wireless network 300 either directly with base stations, such as small cell base station 305f, and macro base station 305e, or in multi-hop configurations by communicating with another user device which relays its information to the network, such as UE 315f communicating temperature measurement information to the smart meter, UE 315g, which is then reported to the network through small cell base station 305f. Wireless network 300 may also provide additional network efficiency through dynamic, low-latency TDD communications or low-latency FDD communications, such as in a vehicle-to-vehicle (V2V) mesh network between UEs 315i-315k communicating with macro base station 305c.

Aspects of the vehicular systems described with reference to, and shown in, FIG. 1, FIG. 2, and FIG. 3 may include isolation of one or more domains of an automated driving SOC to facilitate continued operation of domains that are not impacted by errors that are encountered by one or more other domains. Such isolation may allow domains of an automated driving SOC to continue to operate to bring a vehicle to a safe stop or to resolve errors encountered impacted domains without losing key assisted or autonomous driving capabilities, such as steering, acceleration, braking, and other assistance.

Figure 4:
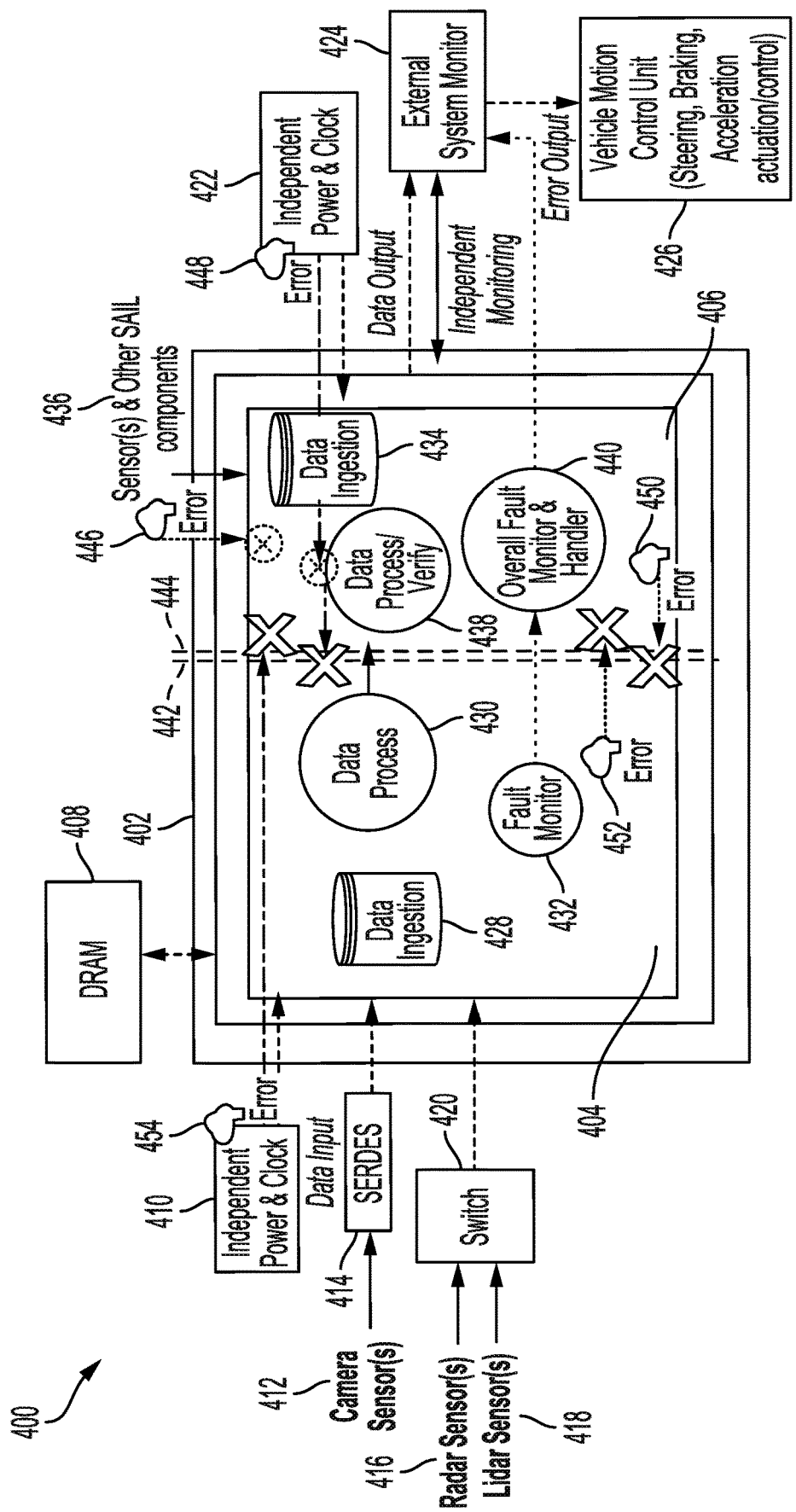
FIG. 4 is a block diagram illustrating details of an example automated system including isolation between domains of an example automated driving SOC according to one or more aspects of the disclosure.

An example block diagram of an automated driving system 400 is shown in FIG. 4. An automated driving SOC 402 may be divided into different domains, such as a first domain 406 and a second domain 404. In some embodiments, the automated driving SOC 402 may be divided into more than two domains. As one example, the first domain 406 may be a safety island (SAIL), and the second domain 404 may be a main domain (MD). Different domains of the SOC 402 may be designed to meet different safety standards. For example, the first domain 406, which may be a SAIL domain, may be designed to meet a first safety standard, and the second domain 404, which may be an MD, may be designed to meet a second safety standard, lower than the first safety standard. The first safety standard of the first domain 406 may, for example, be an automotive safety integrity level D (ASIL D) standard, while the second safety standard of the second domain 404 may be an automotive safety integrity level B (ASIL B) standard according to the International Standards Organization 26262 standard. The second domain 404 may, in some embodiments, include many or all major computing components of the SOC 402, such as one or more processors, such as application processors, computer vision processors, image signal processors, or neural signal processors, GPUs, supporting infrastructure, such as one or more memory controllers, system memory management units, and bus interfaces, and other components. The first domain 406 may, for example, include one or more monitoring modules, such as voltage, clock, temperature, built-in self-test control, time stamp, secure boot, encryption, and other monitoring modules and/or one or more processors or processing cores. For example, a SAIL domain may include one or more computing resources, such as one or more processors or processing cores, infrastructure blocks, and input/output interfaces for monitoring one or more safety characteristics of an automated driving system, such as temperatures, voltages, and other parameters. In some embodiments, a SAIL domain may include one or more I/O interfaces for receiving data from one or more external sensors, such as cameras, lidar sensors, radar sensors, and other sensors. Such interfaces may, for example, connect the SAIL domain to other components of the automated driving system, such as to one or more Ethernet switches, external microcontrollers, or electronic control units (ECUs). For example, the SAIL domain may be connected via one or more Ethernet or CAN interfaces to an ECU in a separate location of the vehicle. In some embodiments, an automated driving SOC 402 may include multiple SAIL domains, or additional SAIL domains may be located outside of automated driving SOC 402.

The second domain 404, which may be an MD, may include or may interface with a dynamic random access memory (DRAM) module 408, one or more camera sensors 412 connected to a serializer/deserializer 414, and/or one or more radar sensors 416 and/or one or more lidar sensors 418 connected to a switch 420. In some embodiments, camera sensors 412, radar sensors 416, and lidar sensors 418 may be otherwise connected to the SOC 402, such as via ethernet, peripheral component interconnect express (PCIe), CAN bus, SPI interfaces, UART interfaces, or other interfaces. Furthermore, additional sensors may also be connected to the SOC 402, such as via one or more PCIe, ethernet, or other interfaces. The second domain 404 may include a data ingestion module 428, a data processing module 430, and a fault monitor module 432. The first domain 406, which may be a SAIL domain, may include a data ingestion module 434, a data processing and verification module 438, and an overall fault monitoring and handling module 440. The first domain 406 may receive information from one or more sensors or other SAIL components 436. The first domain 406 may, for example, perform verification of data and/or calculations performed by the second domain 404. Data may be output from the data processing and verification module 438 of the first domain 406 to an external system monitor 424, such as a microcontroller (MCU). The microcontroller may, for example, be a safety microcontroller. Furthermore, the overall fault monitoring and handling module 440 of the first domain 406 may receive indications of faults from the second domain 404 and may determine a response to such faults. In some cases, the overall fault monitoring and handling module 440 may transmit a notification of one or more detected faults or errors to the external system monitor 424. Such detected faults or errors maybe faults or errors detected by the second domain 404 or first domain 406. In some embodiments, the external system monitor 424 may perform independent monitoring on the SOC 402. The external system monitor 424 may communicate with a vehicle motion control unit 426 such as to control steering, braking, and acceleration actuation or control or other vehicle functions. In some embodiments, instructions for autonomous or assisted driving may be determined by the second domain 404 and verified by the first domain 406 of the SOC 402, passed to the external system monitor 424, and passed from the external system monitor 424 to the vehicle control unit 426 to control the vehicle.

Errors may be encountered by one or more domains of an SOC 402. Some errors may require that one or more domains of an SOC 402 be deactivated and/or powered down. Errors may be triggered by various causes, such as ionic radiation and associated faults.

A first domain 406 may be isolated by isolation 442 from a second domain 404 such that errors encountered by the second domain 404 may not require shutdown of the second domain 406. For example, isolation 442 may include isolation logic such that when the second domain 404 encounters an error, the first domain 406 is isolated from the second domain 404. Isolation 442 may be further provided through use of a first independent power supply and clock 422 for the first domain and a second independent power supply and clock 410 for the second domain. Thus, when an error, such as error 454 in the independent power and clock 410 for the second domain 404 or error 452 in the second domain 404, is encountered by the second domain 404, the first domain 406 may be isolated from the second domain 404. The first domain 406 may then continue to operate in a degraded mode, without assistance from the functionality provided by the second domain 404, while the second domain 404 is, for example, deactivated and/or powered down. Thus, for example, a SAIL domain of an automated driving SOC may continue to function in a degraded mode even when an MD of the automated driving SOC is deactivated.

If isolation is only implemented for a first direction, such as isolation of the first domain 406 when errors occur in the second domain 404, errors that occur in the first domain 406 may require deactivation of the entire SOC. For example, when isolation logic is configured to isolate a SAIL domain only from errors that occur an MD, and not the MD from errors that occur in a SAIL domain, errors that occur in a SAIL domain may require that an MD be deactivated in addition to a SAIL domain. Lack of dual-direction isolation between domains may cause additional problems in systems without an external microcontroller (MCU), such as a safety microcontroller, as an error in a SAIL domain may cause an advanced driver assist or autonomous driving electronic control unit to cease operation. Downtime resulting from SAIL domain errors may be particularly problematic in level 3 or higher autonomous driving systems as downtime may impact the ability of such systems to sustain autonomous driving functionality, even in a degraded mode, until a driver assumes control of the vehicle. For example, level 3 or higher autonomous systems may require continued operation of automated driving systems, such as autonomous driving systems, for various times, such as times up to and exceeding tens of seconds, depending on operational parameters of the vehicle to allow the vehicle to alert a driver to take control and/or to safely decelerate and pull over to a stop at a roadside location. SOCs for automated driving systems, as described herein, may also be used to provide level 1 or level 2 autonomous driving. The levels of autonomous driving referred to herein may correspond to the levels identified by the SAE J3016 standard.

Thus, as shown in FIG. 4, isolation 442 may also be implemented between errors that occur in the first domain 406 and the second domain 404, such as isolation of an MD from errors that occur in a SAIL domain. Such isolation 442 may allow the second domain 404 to continue to function even when critical errors requiring deactivation or power down of the SAIL domain occur. Errors that may occur in the first domain 406 may include one or more errors 450 of the first domain 406, one or more errors 448 of an independent power supply and clock module 422 of the first domain 406, such as errors in one or more power management integrated circuits (PMICs) of the first domain 406, one or more errors 446 of one or more sensors or other SAIL components 436 connected to the first domain 406, such as errors in a serial peripheral interface NOR flash module or one or more sensor modules, or other errors of the first domain 406. Such errors may, as shown in FIG. 4, be blocked by isolation 442 from requiring deactivation and/or power down of the second domain 404. Thus, the isolations 442 and 444 may provide isolation between domains of an automated driving SOC 402, or other SOC, to facilitate continued operation of each respective domain if the other respective domain encounters an error requiring shutdown.

The isolations 442 and 444 may, for example, be isolations between different domains of the SOC that are configured to different levels of a safety standard, such as ASIL B domains, ASIL D domains, domains configured to a quality managed (QM) level, and other domains configured according to different safety levels of the ISO26262 standard or other standards. As one particular example, the isolations 442 and 444 may provide isolation between domains configured according to a QM level or a domain that is not configured according to a safety standard or level and domains configured according to one or more safety levels identified by the ISO 26262 standard, such as ASIL A, ASIL B, ASIL D, or other domains. The isolations 442 and 444 may be facilitated by independent power and clock modules 422, 410 assigned to the first domain 406 and the second domain 404, respectively. The isolations 442 and 444 may also include implementation of isolation logic to prevent cascading faults from the first domain 406 or the second domain 406 from requiring shutdown of the other respective domain. The isolations 442 and 44 may, for example, include electrical isolation between the first domain 406 and the second domain 404.

Figure 5:
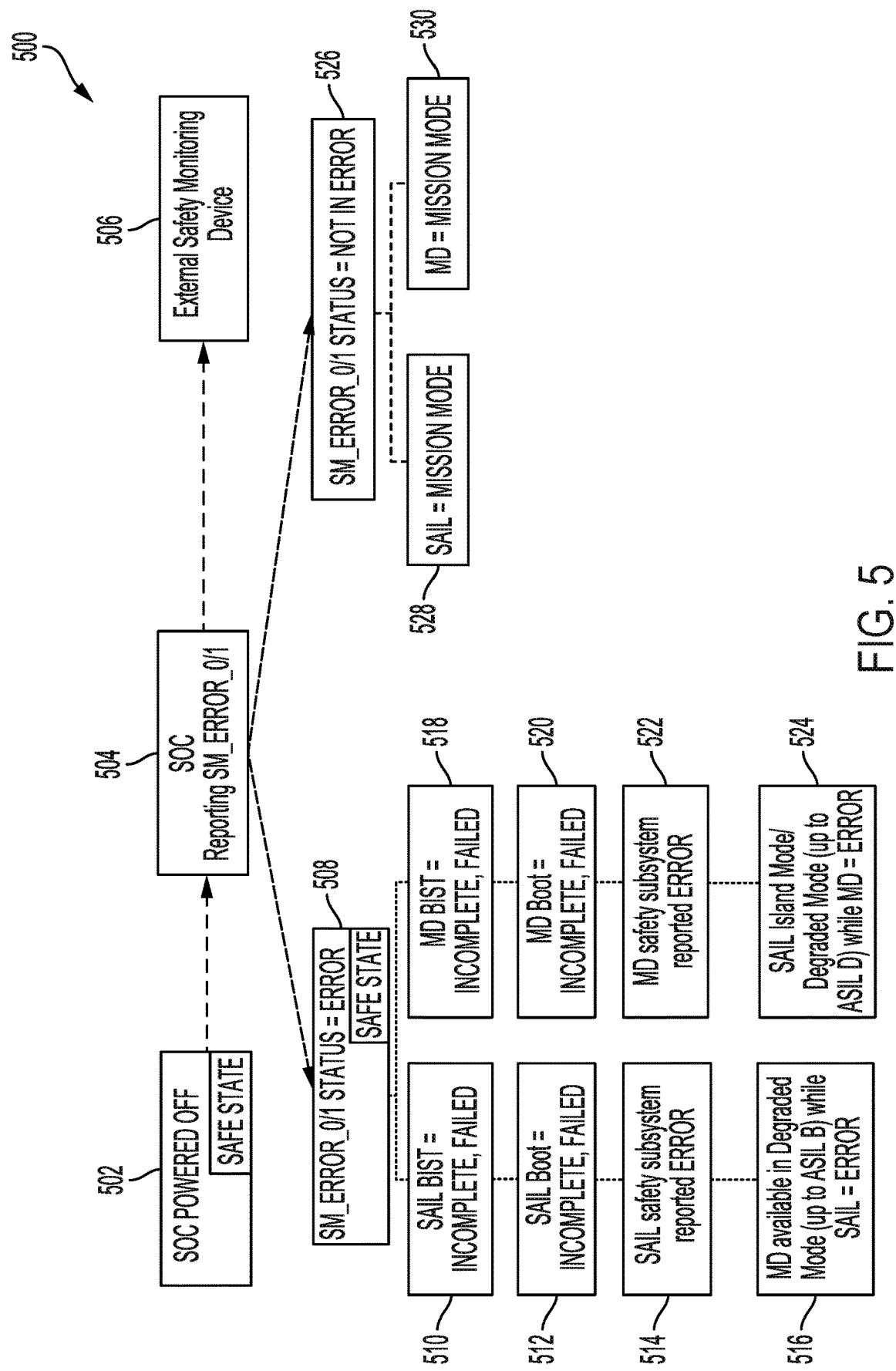
FIG. 5 is an example flow chart illustrating details of states of operation of an example automated driving SOC including isolation between domains according to one or more aspects of the disclosure.

An example flow chart 500 showing respective states of a SAIL domain, which may be a first domain as described herein, and an MD, which may be a second domain as described herein, is shown in FIG. 5. An SOC may be powered off at block 502. A powered off state may be considered a safe state, such as a safe state according to ISO 26262. At block 504, the SOC may be powered on and may make a determination to report an SM_ERROR_0/1 error reporting status. Such a report may, for example, be transmitted to an external safety monitoring device 506, such as an electronic control unit (ECU) or microcontroller (MCU).

The error reporting status of block 504 may indicate that there is an error at block 508. Such an error indication may place one or more domains of the SOC in a safe state, such as a safe state according to ISO 26262.

The error may, for example, be an error in a SAIL domain of the SOC. For example, at block 510, a SAIL built-in self-test (BIST) may fail and/or remain incomplete. At block 512, booting of the SAIL domain may fail and/or remain incomplete. At block 514, a SAIL safety subsystem may report an error. In some embodiments, the error status indicated at block 508 may result from one or more of the errors described at blocks 510-514. As a result of the error in the SAIL domain, an MD of the SOC may enter a degraded mode, such as a mode in up to ASIL B operation, at block 516. For example, isolation between the SAIL domain and the MD may be activated and the MD may continue to operate in a degraded mode without communicating with the SAIL domain.

As another example, the error may be an error in an MD of the SOC. For example, at block 518, an MD built-in self-test (BIST) may fail and/or remain incomplete. At block 520, booting of the MD may fail and/or remain incomplete. At block 522, an MD safety subsystem may report an error. In some embodiments, the error status indicated at block 508 may result from one or more of the errors described at blocks 518-522. As a result of the error in the MD, a SAIL domain of the SOC may enter a degraded mode, such as a mode in up to ASIL D operation, at block 524. For example, isolation between the MD and the SAIL domain may be activated and the SAIL domain may continue to operate in a degraded mode without communicating with the MD.

The error reporting status block 504 may indicate that there is no error at block 526. As a result, at 528 the SAIL domain may enter mission mode, and the MD, at block 530, may enter mission mode. The SAIL domain and the MD may thus continue to communicate with each other, such as via a shared mailbox when no error is detected.

Figure 6:
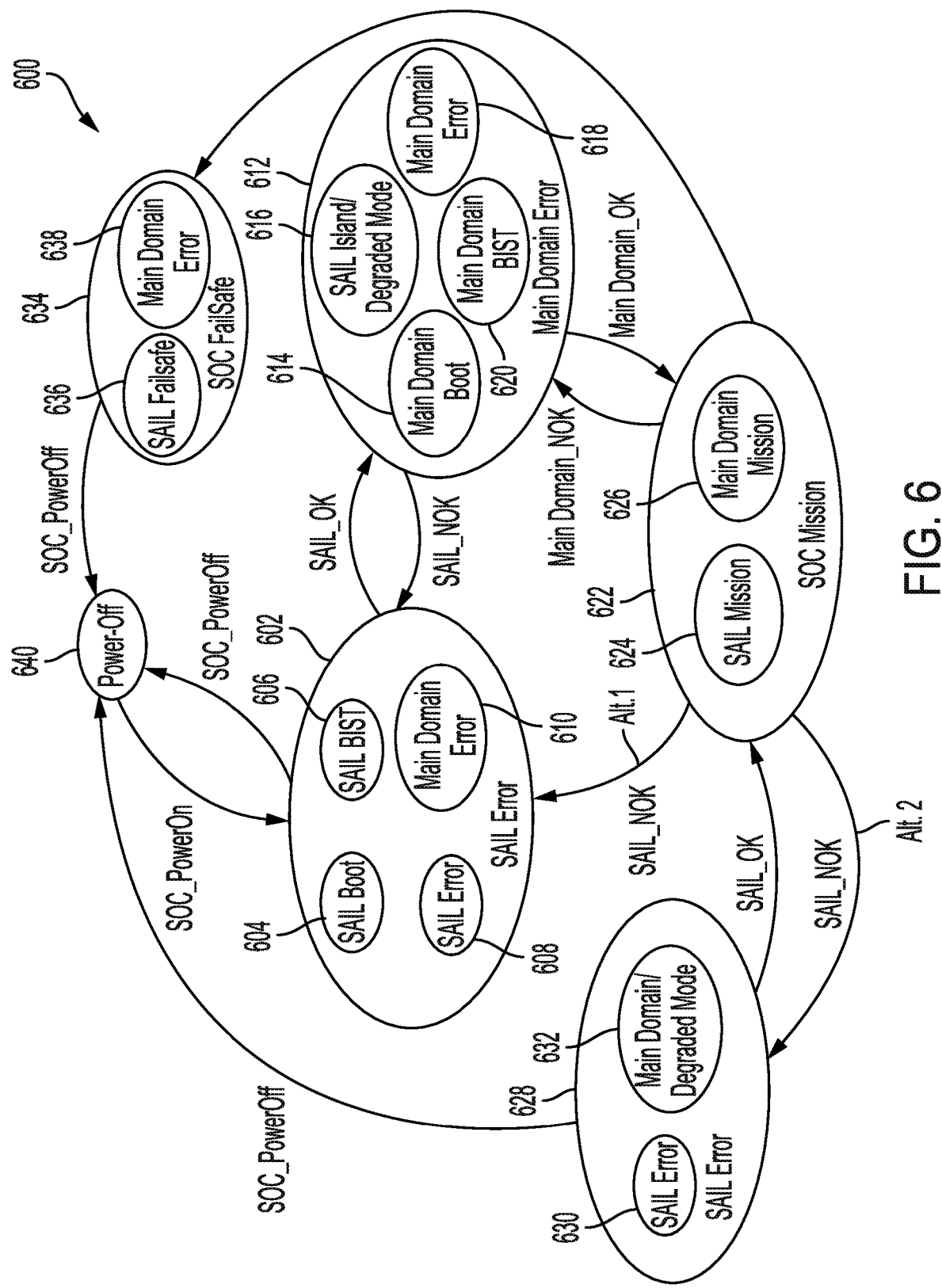
FIG. 6 is an example state diagram illustrating a state flow of example states of an example automated driving SOC including isolation between domains according to one or more aspects of the disclosure.

An example state flow diagram 600 of an SOC having a SAIL domain and an MD is shown in FIG. 6. Upon power on of the SOC, the SOC may proceed from a power off state 640 to an assumed SAIL domain error state 602. In the SAIL domain error state 602, the SAIL domain may be in a SAIL error state 608 and the MD may be in an MD error state 610. The SAIL domain may be placed in the SAIL error state 608 due to failure of the SAIL to boot, unresponsiveness of the SAIL domain, or detection of an error, such as an uncorrectable error, in the SAIL domain. Alternatively or additionally, in the SAIL domain error state 602, the SAIL domain may be in a SAIL boot state 604, where the SAIL domain may be in a process of booting and may respond to CAN or ETH discovery messages, or in a SAIL BIST state 606, where the SAIL domain may be undergoing BIST sequences.

If the SAIL domain is not determined to be in error a SAIL_OK message may be generated and transmitted to a controller, such as an external system monitor, ECU, or MCU, and the SOC may proceed to an MD assumed error state 612. In the MD error state 612, the MD may be in an MD error state 618 and the SAIL domain may be in a SAIL degraded mode state 616. SAIL degraded mode 616 may also be referred to as island mode. In the SAIL degraded mode state 616, the SAIL domain may operate under limited safety policy defined conditions, such as conditions defined by a manufacturer. For example, in the SAIL degraded mode state 616, the SAIL may perform minimum risk maneuvers, such as maneuvers selected by manufacturer safety policies. In some embodiments, if the SAIL degraded mode state 616 is entered as a result of an error in the MD, the SAIL domain may attempt to reboot the MD to recover the MD from the error back into an MD mission state 626. As shown in FIG. 6, the SAIL degraded mode state 616 may be entered while a main domain of the SOC is still in boot or BIST states. In the SAIL degraded mode state 616, the SAIL domain may be limited to use of compute and resource capabilities within the SAIL domain, as the MD may be in an error, boot, or BIST state. In the MD assumed error state 612, the MD may be in an MD boot state 614, where the MD may be in the process of booting and may respond to CAN or ETH discovery messages, or an MD BIST state 620, wherein the MD may undergo one or more BIST sequences. In the MD assumed error state 612, the MD may be deactivated or in the process of initializing, and the SAIL domain may be isolated from the MD. Thus, the SAIL domain may operate in a degraded mode without input from the MD. If a SAIL error is detected while the SAIL domain is operating in degraded mode, a SAIL-NOK notification may be issued, and the SOC may proceed to operate in the SAIL error state 602. If the SAIL error is not correctable, the SOC may proceed to issue an SOC_PowerOff notification to a controller and may return to the power off state 640.

If the MD is not determined to be in error, a Main Domain_OK notification may be issued to a controller, and the SOC may proceed to an SOC mission state 622. In the SOC mission state, the SAIL domain may operate in a SAIL mission state 624 and the MD may operate in a main domain mission state 626. In the SOC mission state 622, the SAIL domain and the MD may communicate with each other via a mailbox. In the SOC mission state 622, booting of the SAIL domain and the MD may be completed, safety mechanisms may be activated, fault monitoring of the MD and SAIL domain may be active, and the MD and SAIL domain may be performing defined safety functions. If the MD encounters an error while the SOC is in the SOC mission state 622, a Main Domain_NOK notification may be transmitted to a controller and the SOC may proceed to the MD error state 612, where the SAIL domain may be placed in a SAIL degraded mode state 616.

In some configurations, if the SAIL domain fails during SOC mission mode, the SAIL domain may issue a SAIL_Failsafe notification and the SOC may proceed to an SOC failsafe mode 634. In the SOC failsafe mode, the SAIL domain may be placed in a SAIL failsafe state 636 and the MD may be placed in an MD error state 638. In the SAIL failsafe state 636, the SAIL may operate under limited capability, such as capabilities set by a manufacturer safety policy, to put the vehicle in a safe state to perform minimum risk maneuvers. Once minimum risk maneuvers are complete, such as once the vehicle reaches a stop at a safe roadside location, the SOC may issue an SOC_PowerOff notification and may proceed to the power off state 640. In a SAIL failsafe state 636, for example, the SAIL domain may perform minimum risk maneuvers and shut down the SOC, while in the SAIL degraded mode state 616, the SAIL may attempt to recover and/or reboot the MD.

As another example, if isolation is not provided between errors in the SAIL domain and the MD, when the SAIL domain encounters an error in SOC mission mode 622 a SAIL_NOK may be issued and the SOC may proceed to the SAIL error state 602. However, if isolation is provided between errors in the SAIL domain and the MD, when the SAIL domain encounters an error in SOC mission mode 622, a SAIL_NOK may be issued, and the SOC may proceed to alternate SAIL error state 628. In alternate SAIL error state 628, the SAIL domain may be in a SAIL error state 630, and the MD may enter an MD degraded mode state 632. In the MD degraded mode state 632, the MD may operate in a degraded mode. If the SAIL domain error is resolved in the alternate SAIL error state 628, such as by rebooting the SAIL domain and performing a SAIL BIST on the SAIL domain during the reboot process, a SAIL_OK may be issued and the SOC may proceed to return to the SOC mission state 622. In particular, the SAIL domain, the error is resolved by rebooting the SAIL domain, may be re-initialized into the SAIL mission mode 624. Thus, isolation of the MD from errors in the SAIL domain may allow for resolution of the errors in the SAIL domain and resumption of an SOC mission state 622, rather than requiring an eventual shutdown of the SOC. If the SAIL domain error is not resolved, the MD may continue to operate in degraded mode until a safe state of the vehicle is obtained, such as when a driver assumes control of the vehicle or the vehicle is safely stopped at the roadside. Then, an SOC_PowerOff may be issued, and the SOC may proceed to the power off state 640. Thus, when isolation is provided between errors in the MD and the SAIL domain and between errors in the SAIL domain and the MD, the MD or SAIL domain may operate in a degraded mode, when the other of the MD or SAIL domain encounters an error, rather than requiring a shutdown of the SOC when the SAIL domain encounters an error.

Figure 7:
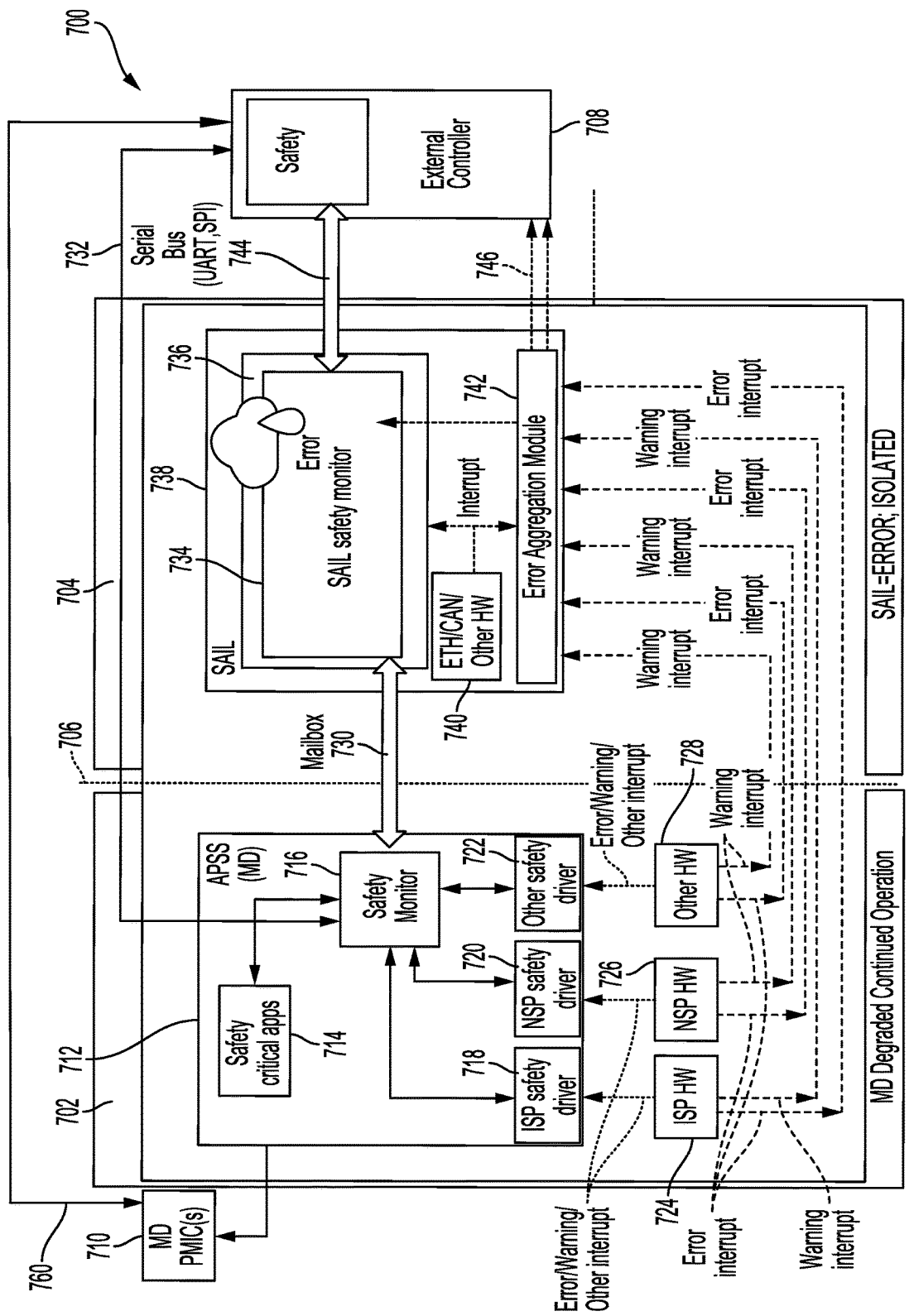
FIG. 7 is an example block diagram illustrating details of an example automated driving system including isolation between domains of an example automated driving SOC according to one or more aspects of the disclosure.

An example layout of an automated driving system 700 is shown in FIG. 7. The automated driving system may include an MD 702 and a SAIL domain 704, which, together, may form part or all of an automated driving SOC of the automated driving system 700. The automated driving system 700 may further include one or more MD PMICs 710 and an external controller 708, which may be a microcontroller (MCU), an electronic control unit (ECU), a field programmable gate array (FPGA), an application-specific integrated circuit (ASIC), or other controller. The MD 702 and the SAIL domain 704 may be configured according to different safety standards. For example, the SAIL domain 704 may be configured according to a higher safety standard than the MD 702, as described herein.

The MD 702 may include one or more processors, such as an application processor 712. The application processor 712 may execute one or more safety critical apps 714, a MD safety monitor process 716, and one or more drivers, such as an image signal processing (ISP) safety driver 718, a neural signal processing (NSP) safety driver 720, and one or more other safety drivers 722. The drivers of the application processor 712 may communicate with one or more other hardware modules of the MD 702. For example, the ISP safety driver 718 may communicate with ISP hardware 724, such as one or more image signal processors, the NSP safety driver 720 may communicate with NSP hardware 726, such as one or more neural signal processors, and the other safety drivers 722 may communicate with other hardware components 728 such as sensors, GPUs, other processing units, and other hardware components. Communications between safety drivers 718, 720, 722 and hardware components 724, 726, 728 may include communication of error, warning, or other interrupts that occur in or are related to hardware components 724, 726, 728. Error and warning interrupts may also be transmitted from the hardware components 724, 726, 728 to an error aggregation module 742 of the SAIL domain 704.

The SAIL domain 704 may include a SAIL processor 736, which may execute a SAIL safety monitor process 734. The SAIL domain 704 may further include other hardware components 740, such as an Ethernet interface, a CAN interface, and other hardware components, such as other interfaces, sensors, or hardware components. The error aggregation module 742 may be a hardware error aggregation module and may communicate interrupts with the SAIL safety monitor process 734 via one or more interfaces. The SAIL safety monitor process 734 may communicate with the MD safety monitor process 716 via a mailbox 730. The SAIL safety monitor process 734 may further communicate with a safety application of an external controller 708 via a serial bus interface, such as a universal asynchronous receiver-transmitter (UART) interface, an Ethernet interface, a CAN bus, or a serial peripheral interface (SPI). In some embodiments, the error aggregation module 742 may communicate with the external controller 708 via one or more error pins.

The MD 702 may be isolated from errors that occur in the SAIL domain 704 by isolation 706 which may include isolation logic and/or electrical isolation of the two domains. To facilitate communication between the MD 702 and the external controller 708 when the SAIL domain 704 encounters an error and isolation 706 is activated, the MD 702 may be connected to the external controller 708 by an interface 732, such as a CAN interface or other interface.

As one example of an error in the MD 702, an error may detected in the ISP hardware 724, such as in ISP on-chip memory. Alternatively or additionally, errors may be detected in the application processor 712 or another component of the MD 702. The error aggregation module 742 may receive a functional safety error signal notifying the error aggregation module 742 of the error. Similarly, the ISP safety driver 718 may receive an interrupt to alert the safety monitor process 716 of the application processor 712 of the error. The error aggregation module 742 may notify the external controller 708 and the SAIL safety monitor process 734 of the error. The safety monitor process 716 of the application processor 712 may determine a cause of the error and may provide details regarding the error, such as the cause of the error, to the SAIL safety monitor process 734 through the mailbox 730. When the error aggregation module 742 receives the error signal, the error aggregation module 742 may initiate a timer set to a first period of time. If error information is not received via the mailbox 730 before the timer runs out, the error indication may time out. However, if the SAIL safety monitor process 734 receives information regarding the error via the mailbox 730 before the timer runs out, the SAIL safety monitor 734 may transmit error and/or health information to the external controller 708 via serial bus 744. Thus, information regarding an error of the MD 702 may be transmitted from the MD 702 to the SAIL domain 704 and from the SAIL domain 704 to the external controller 708 when the MD 702 and SAIL domain 704 are operating in mission mode. For example, when both the MD 702 and SAIL domain 704 are operational, the MD 702 may communicate with the external controller 708 through the SAIL domain 704 and not via the bus 732.

If an error detected in the MD 702 is determined to require isolation of the SAIL domain 704 from the MD 702, such as if the error is determined to be uncorrectable, the SAIL domain 704 and/or the MD 702 may activate isolation 706, such as by activating isolation logic. In some embodiments, activation of isolation logic may be initiated before or during transmission of error interrupts and/or error information from the MD 702 to the SAIL domain 704. After the SAIL domain 704 is isolated from the MD 702, the SAIL domain 704 may operate in a degraded mode, without access to computing capacity and/or other resources of the MD 702. In the SAIL degraded mode, the SAIL safety monitor process 734 may continue to communicate with the safety application of the external controller 708 over the serial interface 744, such as to notify the external controller of any errors detected in the SAIL domain 704 or to maintain a continuous heartbeat check between the SAIL domain 704 and the external controller 708. When the vehicle in which the automated driving system 700 is located has reached a safe state, such as after performing manufacturer-defined minimum risk maneuvers, the SAIL domain 704, such as processor 736 of the SAIL domain, may transmit an instruction to one or more SAIL PMICs to power down the SOC including the MD 702 and the SAIL domain 704, such as via a SAIL_PS_HOLD shutdown request. Thus, when the MD 702 encounters an error, such as an uncorrectable error, the SAIL domain 704 may be isolated from the MD 702 and may continue to operate in a degraded mode until the SOC may be powered down safely.

Isolation 706 may also isolate the MD 702 from errors that are detected in the SAIL domain 704. In some embodiments, isolation 706 may include logical and electrical isolation to provide bidirectional isolation between the MD 702 and the SAIL domain 704. When an error 738 is detected in the SAIL domain 704, such as an error in the processor 736 or another component of the SAIL domain 704, isolation 706 may be activated to isolate the MD 702 from the SAIL domain 704. For example, the MD 702 may receive a notification of an error in the SAIL domain, such as a SAIL-ERROR signal, via mailbox 730, via internal SOC signals between the SAIL and MD, or via another interface between the SAIL processor 734 and the application processor 712 of the MD 702, and may activate the isolation 706, such as isolation logic between the MD 702 and the SAIL domain 704. Such isolation 706 may allow the MD 702 to continue to operate in a degraded mode, even when the SAIL domain 704 is in an error state. For example, when an error, such as error 738, is detected in the SAIL domain 704, isolation 706, such as isolation logic, between the MD 702 and the SAIL domain 704 may be activated. In some embodiments, the application processor 712, or another MD subsystem, may activate the isolation 706 upon receipt of a notification of the error that occurred in the SAIL domain 704 by the safety monitor process 716 via the mailbox 730 or other signaling between the SAIL domain 704 and the MD. Upon activation of the isolation 706, the safety monitor process 716 may no longer depend on or communicate with the SAIL safety monitor process 734 executed by the SAIL processor 736. For example, the safety monitor process 716 of the MD 702 and the SAIL safety monitor process 734 of the SAIL domain 704 may cease to communicate via the mailbox 730 when the isolation 706 is activated.

In order to maintain communication between the SOC including the MD 702 and the SAIL domain 704 and the external controller 708, the MD 702 may begin to communicate with the external controller 708 via bus 732, which may be a CAN bus, Ethernet interface, serial interface, such as an SPI or UART interface, or other interface when isolation 706 is activated. For example, when the SAIL domain 704 and the MD 702 are operating in mission mode, the MD 702, such as the safety monitor process 716 of the MD 702, may communicate with the external controller 708 via the SAIL safety monitor process 734 of the SAIL domain 704 and not via the bus 732. Thus, once the isolation 706 is activated in response to an error of the SAIL domain 704, the MD 702 may operate in degraded mode and may communicate with the external controller 708 via bus 732. In some embodiments, the safety monitor process 716 of the application processor 712 may communicate with the external controller 708 via bus 732. Information communicated via the bus 732 may include MD health information, such as information regarding one or more errors encountered by the MD 702, and information for maintaining a continuous heartbeat check between the MD 702 and the external controller 708. When the vehicle including the automated driving system 700 has reached a safe state, such as a safe state determined by the manufacturer of the vehicle, the MD application processor 712 may transmit a power down request to one or more MD PMICs 710, such as an MD_P-S_HOLD power down request to power down the SOC including the MD 702 and the SAIL domain 704. Alternatively or additionally, the MD 702 may reboot the SAIL domain 704, such as by rebooting the processor 736 of the SAIL domain to attempt to correct the error detected in the SAIL domain 704. If the error is corrected, the isolation 706 may be deactivated, and the MD 702 and SAIL domain 704 may proceed to operate in mission mode. Thus, isolation 706 between the SAIL domain 704 and the MD 702 may allow the MD 702 to continue to operate in a degraded mode when the SAIL domain 704 encounters an error that triggers an error state of the SAIL domain 704, such as a state requiring deactivation of the SAIL domain 704. The SAIL domain 704 may be configured to refrain from shutting down the MD 702, when the SAIL domain 704 enters an error state.

When the MD 702 is operating in degraded mode, such as when isolation 706 is activated and the SAIL domain 704 is in an error state, a variety of continued functions may be performed by the MD 702 in degraded mode, such as to allow the automated driving system 700 to continue to provide assisted or autonomous driving functionality until functionality of the SAIL domain 704 is restored or until the vehicle is brought to a safe state and the SOC including the SAIL domain 704 and the MD 702 may be safely deactivated. As one example, the MD 702 may continue to perform functional safety (FUSA) error monitoring of the MD 702. Such monitoring may include monitoring of subsystems of the MD 702, such as monitoring of one or more GPUs of the MD 702, one or more NSPs 726 of the MD 702, one or more ISPs 724 of the MD, or one or more other components 728 of the MD. Indications of errors, warnings, or other interrupts for such components may continue to be transmitted to the application processor 712, as described herein, and detected by drivers 718, 720, 722 of the application processor 712. Furthermore, the safety monitor process 716 may continue to handle such errors and/or warnings and transmit indications of such errors, warnings, or other interrupts to the ECU 708 via bus 732.

In some embodiments, an automated driving system 700 may include other SAIL domains in addition to SAIL domain 704. In some embodiments, additional SAIL domains may be located on the same SOC, such as on a same die, as the MD 702 and the SAIL domain 704. In some embodiments, additional SAIL domains may be located on other SOCs, such as on other dies in a same package. In some embodiments, the SAIL domain 704 may be a SAIL domain of a primary die, while another SAIL domain may be a SAIL domain of a secondary die. If the SAIL domain 704 of the primary die fails, the SAIL domain of the secondary die may communicate with the MD 702 and may allow the MD 702 to continue to operate in mission mode. If the SAIL domain of the secondary die fails, the SAIL domain 704 of the primary die may continue to operate, along with the MD 702, in mission mode. If all alternative SAIL domains fail, the MD may isolate from all SAIL domains and may operate in degraded mode.

One or more voltage rails of the MD 702 may also be monitored while the MD 702 is operating in degraded mode, such as by one or more PMICs 710 of the MD 702. For example, one or more PMICs 710 of the MD 702 may provide voltage monitoring of one or more MD rails. In some embodiments, the one or more PMICs 710 of the MD 702 may communicate directly with the external controller 708, such as by transmitting one or more error signals when one or more errors are detected with respect to the one or more MD rails. Such signals may, for example, be transmitted via an interface 760. In some embodiments, a timing guard band monitor, which may also provide detection of under-voltage faults, may be provided while the MD 702 is in degraded mode. Furthermore, adaptive clock distribution circuits within one or more safety subsystems of the MD 702 may monitor for voltage droop events while the MD is in degraded mode. While the MD 702 is isolated from the SAIL domain 704 and is operating in degraded mode, however, on-die voltage monitoring of voltage rails of the SOC may not be provided.

One or more clocks associated with the MD 702 while the MD 702 is operating in degraded mode may also be monitored, such as by the MD PMICs 710. For example, the MD PMICs 710 may perform clock monitoring of one or more crystal oscillators for MD clock input. In some embodiments, the one or more PMICs 710 of the MD 702 may communicate directly with the external controller 708, such as by transmitting one or more error signals when one or more errors are detected with respect to the one or more MD clocks. In some embodiments, no on-die clock monitoring may be performed while the MD 702 is in degraded mode. In some embodiments, one or more clock monitoring units, such as advanced clock monitoring units, may be included in the MD 702 of the SOC to perform on-die clock monitoring while the MD 702 is in degraded mode.

The MD application processor 712 may also monitor one or more temperatures associated with the MD 702. For example, one or more temperature sensing controllers in the MD 702 may monitor one or more temperatures and may report sensed temperatures outside of one or more temperature ranges to the safety monitor process 716 of the application processor 712.

The MD application processor 712 may also perform hardware and software diagnostics in the MD 702 when the MD 702 is in degraded mode. Such diagnostics may include application processor 712 hardware and software diagnostics, neural signal processor 726 hardware and software diagnostics, GPU diagnostics memory diagnostics, network diagnostics, and other diagnostics. For example, error correcting code, parity, watchdog, and other diagnostics may continue to be executed in the MD 702, while the MD 702 is in degraded mode. As another example, one or more software test libraries for the application processor 712, the NSP hardware 726, the ISP hardware 724, or the other hardware 728, may continue to be executed while the MD 702 is in degraded mode. Such software test libraries may, for example, include one or more software tests that are run in the background to execute one or more tests on safety subsystems, such as GPU, NSP, and other subsystems within the MD. Such tests may compare an output from the executed tests with a threshold value, such as a golden value, to determine whether the subsystes are operating correctly. In some embodiments, additional health checks and diagnostics may be performed by the MD application processor 712 when the MD 702 enters degraded mode that are not performed when the MD is in mission mode. In some embodiments, additional periodic health check status information may be provided by the MD 702 to the ECU 708 over the bus 732 when the MD 702 is in degraded mode.

In some embodiments, isolation 706 may allow for updating a firmware or software of the MD 702 or the SAIL domain 704. For example, an update, such as an over the air update to the SAIL domain 704 or the MD 702, may be received by automated driving system 700, and isolation 706 may be activated. Such an update may, for example, be an update for reprogramming a software image of SAIL external memory. If the update is an update to the SAIL domain 704, the isolation 706 may be activated to isolate the MD 702 from the SAIL domain, and the MD 702 may continue to operate in degraded mode while the SAIL domain 704 is being updated. Likewise, if the update is an update to the MD 702, the isolation 706 may be activated to isolate the SAIL domain 704 from the MD 702, and the SAIL domain 704 may continue to operate in degraded mode while the MD 702 is being updated. When application of the update is completed, the isolation 706 may be deactivated, and the MD 702 and the SAIL domain 704 may resume operation in mission mode.

Figure 8:
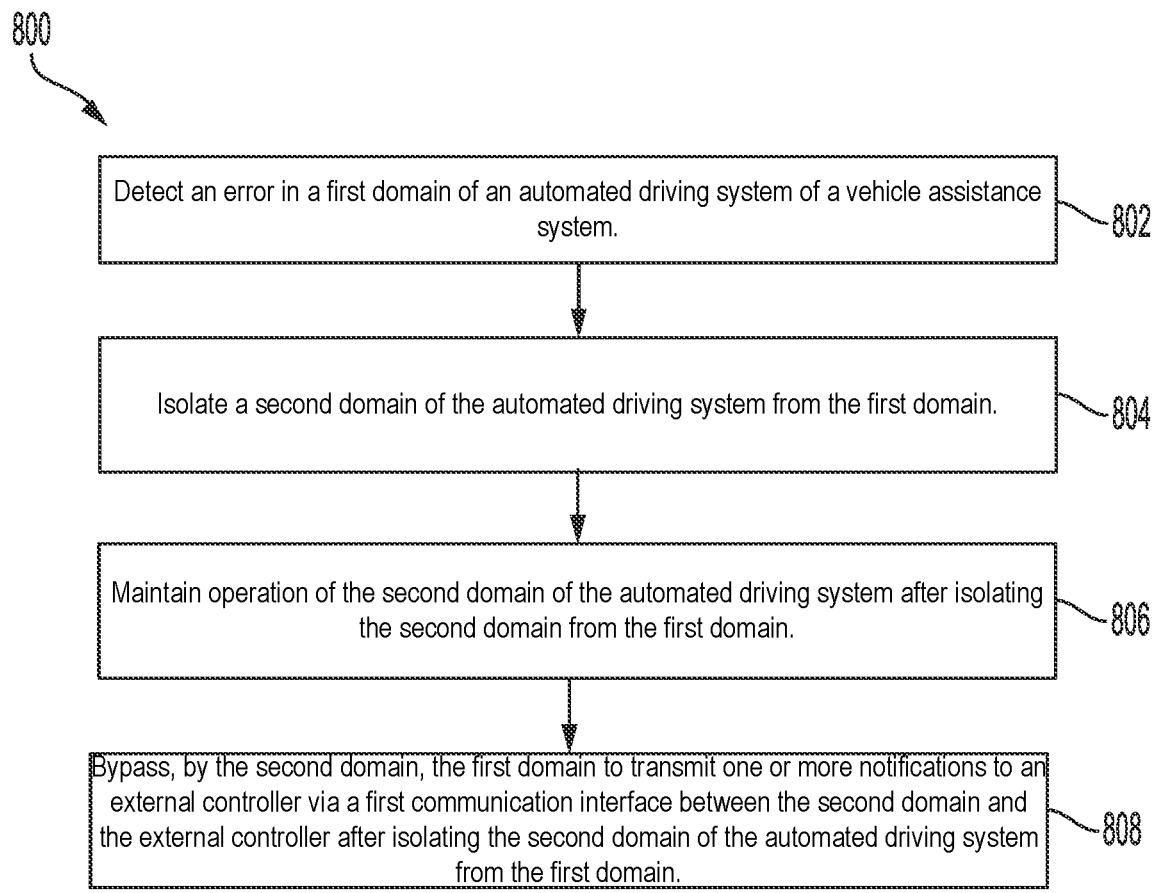
FIG. 8 is a flow chart illustrating an example method for isolation of a second domain of an example automated driving SOC from a first domain of the automated driving SOC according to one or more aspects of the disclosure.

One method of domain isolation in an automotive SOC according to embodiments described above is shown in FIG. 8. FIG. 8 is a flow chart illustrating an example method 800 for isolating a second domain of an SOC from a first domain of the SOC when an error is detected in the first domain of the SOC. A method 800 includes, at block 802, detecting an error in a first domain of an SOC of an automated driving system. For example, the first domain may be a SAIL domain of an SOC, such as an automated driving SOC. The SOC may also include a second domain, such as an MD of the SOC. In some embodiments, the first domain may be configured according to a first safety standard, and the second domain may be configured according to a second safety standard. The first safety standard may be higher than the second safety standard. For example, the first domain may be configured to meet the ASIL D safety standard, while the second domain may be configured to meet the ASIL B safety standard. In some embodiments, detecting the error in the first domain may include determining that the error is of a certain type. For example, detecting the error may include determining that the error is an uncorrectable error. In some embodiments, the method 800 may be performed by one or more processors of a second domain of an SOC, such as one or more processors of an MD of the SOC. Detection of an error in the first domain may, for example, include receiving, by a processor of a second domain, a notification of an error detected in the first domain, such as via a mailbox or other signaling between the processor of the second domain and a processor of the first domain.

At block 804, a second domain of the SOC, such as an MD of the SOC, may be isolated from the first domain of the SOC. Isolating the second domain of the SOC from the first domain of the SOC may include activating isolation logic between the second domain of the SOC and the first domain of the SOC. For example, activating the isolation logic may include ceasing communications between the first domain of the SOC and the second domain of the SOC. Furthermore, isolating the second domain of the SOC from the first domain of the SOC may include activating electrical isolation between the second domain of the SOC and the first domain of the SOC. Isolation of the second domain from the first domain may, for example, be performed by a processor of the second domain in response detection of the error of the first domain. In some embodiments, the first domain may be deactivated or shut down after the second domain is isolated from the first domain.

At block 806, operation of the second domain of the SOC may be maintained after isolating the second domain from the first domain. For example, the second domain of the SOC may continue to operate in a degraded mode after the second domain is isolated from the first domain. In the degraded mode, the second domain may continue to perform one or more functions of the second domain, such as one or more MD functions, without information input from the first domain. Maintaining operation of the second domain may include monitoring, by the second domain, such as by a processor of the second domain, a voltage of one or more voltage rails associated with the second domain, monitoring, by the second domain, a clock associated with the second domain, monitoring, by the second domain, a temperature associated with the second domain, performing, by the second domain, hardware diagnostics on the second domain, or performing, by the second domain, software diagnostics on the second domain. In some embodiments, maintaining operation of the second domain may include generating, by one or more processors or other components of the second domain, instructions for performing minimum risk maneuvers of the vehicle. For example, the second domain may be configured, in the degraded mode, to safely perform one or more assisted or autonomous driving functions. In some embodiments, such functions may be executed to bring the vehicle to a safe stop at a roadside. In some embodiments, after minimum risk maneuvers have been performed, such as after the vehicle is safely pulled to a roadside or after a driver has assumed control of the vehicle, the second domain, such as a processor of the second domain, may transmit a shutdown request to one or more power regulators, such as one or more PMICs of the second domain, to deactivate the SOC including the first domain and the second domain.

At block 808, the first domain may be bypassed, by the second domain, to transmit one or more notifications to an external controller via first communication interface between the second domain and the external controller after isolating the second domain of the SOC from the first domain. In some embodiments, the external controller may be a microcontroller, such as a safety microcontroller, of the automated driving system. Before the error is detected in the first domain, the second domain may communicate with the external controller via the first domain, such as via one or more safety processes executed by a processor of the second domain. Thus, before an error is detected in the first domain, the second domain may not communicate directly with the external controller. However, after isolation is activated at block 804, the second domain may be unable to communicate with external controller via the first domain, as the second domain may be isolated from the first domain. Thus, the second domain may bypass the first domain to communicate with the external controller via a first communication interface. The first communication interface may, for example, comprise a CAN interface, a serial interface, or another interface. The one or more notifications may include an indication of a health of the second domain, an indication of one or more errors detected in the second domain, or one or more heartbeat check notifications. Thus, to facilitate continued operation of the second domain when the second domain is isolated from the first domain, the second domain may bypass the first domain to communicate with an external controller via a first communication interface after the second domain is isolated from the first domain.

Figure 9:
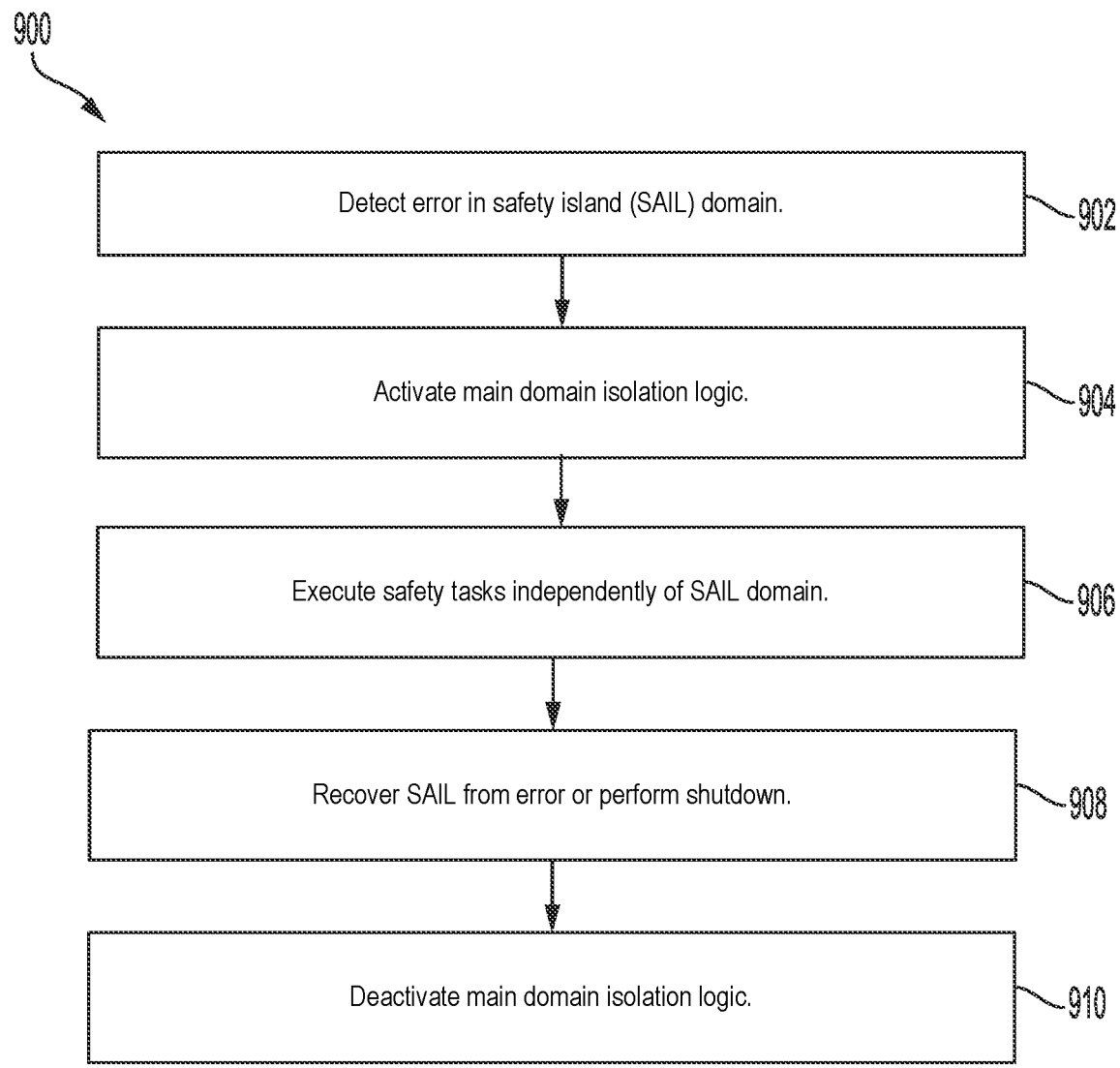
FIG. 9 is a flow chart illustrating an example method for isolation of a second domain of a automated driving SOC from a first domain of the automated driving SOC according to one or more aspects of the disclosure.

One method of domain isolation in an automotive SOC according to embodiments described above is shown in FIG. 9. The operations of a method 900 may be performed along with one or more blocks of the method 800 or the method 1000. FIG. 9 is a flow chart illustrating an example method for isolating a second domain of an SOC from a first domain of the SOC when an error is detected in the first domain of the SOC. The method 900 includes, at block 902, detecting an error in a SAIL domain of an automated driving SOC. As described herein an automated driving SOC may include an MD and a SAIL domain. The method 900 may, for example, be performed by an application processor of an MD of the SOC and/or one or more other subsystems of the MD, such as a control processor. Detecting the error in the SAIL domain may, for example, include receiving an indication of the error via a mailbox or other signaling between the MD and the SAIL domain.

At 904, main domain isolation logic may be activated. For example, in response to detection of the error in the SAIL domain, an application processor of the MD may activate isolation between the MD and the SAIL domain. Activation of the MD isolation logic may include activating electrical isolation between the SAIL domain and the MD.

At 906, one or more safety tasks may be executed independently of the SAIL domain. For example, after activating the MD isolation logic, the MD may continue to operate in a degraded mode, without input from the SAIL domain. The MD may continue performing one or more autonomous or assisted driving functions, such as performing minimum risk maneuvers. The MD may, for example, communicate with an external controller, bypassing the SAIL domain, via a communication interface, as described with respect to FIG. 8. Furthermore, the MD may continue to perform one or more monitoring functions of the MD, as described herein.

At 908, the SAIL domain may be recovered from the error state or a shutdown may be performed. For example, the MD may attempt to recover the SAIL domain from the detected error, such as by rebooting the SAIL domain. If the MD is unable to recover the SAIL domain from the error, the MD may perform a shutdown once the vehicle is in a safe state, as described herein, such as after performing minimum risk maneuvers. If the MD is able to recover the SAIL domain from the error, the MD may detect that the error has been resolved.

At 910, if the SAIL domain is recovered from the error state, the MD may deactivate the main domain isolation logic. For example, the MD may deactivate isolation logic between the MD and the SAIL domain in accordance with resolution of the error. In some embodiments, the MD may begin to communicate with the SAIL domain via the mailbox. Furthermore, the MD may cease operating in a degraded mode after the isolation is deactivated and may resume operation in a mission mode, along with the SAIL domain, as described herein. After the MD isolation logic is deactivated, the MD may cease direct communication with the external controller via a communication interface, and may communicate with the external controller via the SAIL domain. Thus, isolation between the MD and the SAIL domain may allow the MD to attempt to recover the SAIL domain, such as by rebooting the SAIL domain, when the SAIL domain encounters an error requiring isolation from the MD for continued MD function.

Figure 10:
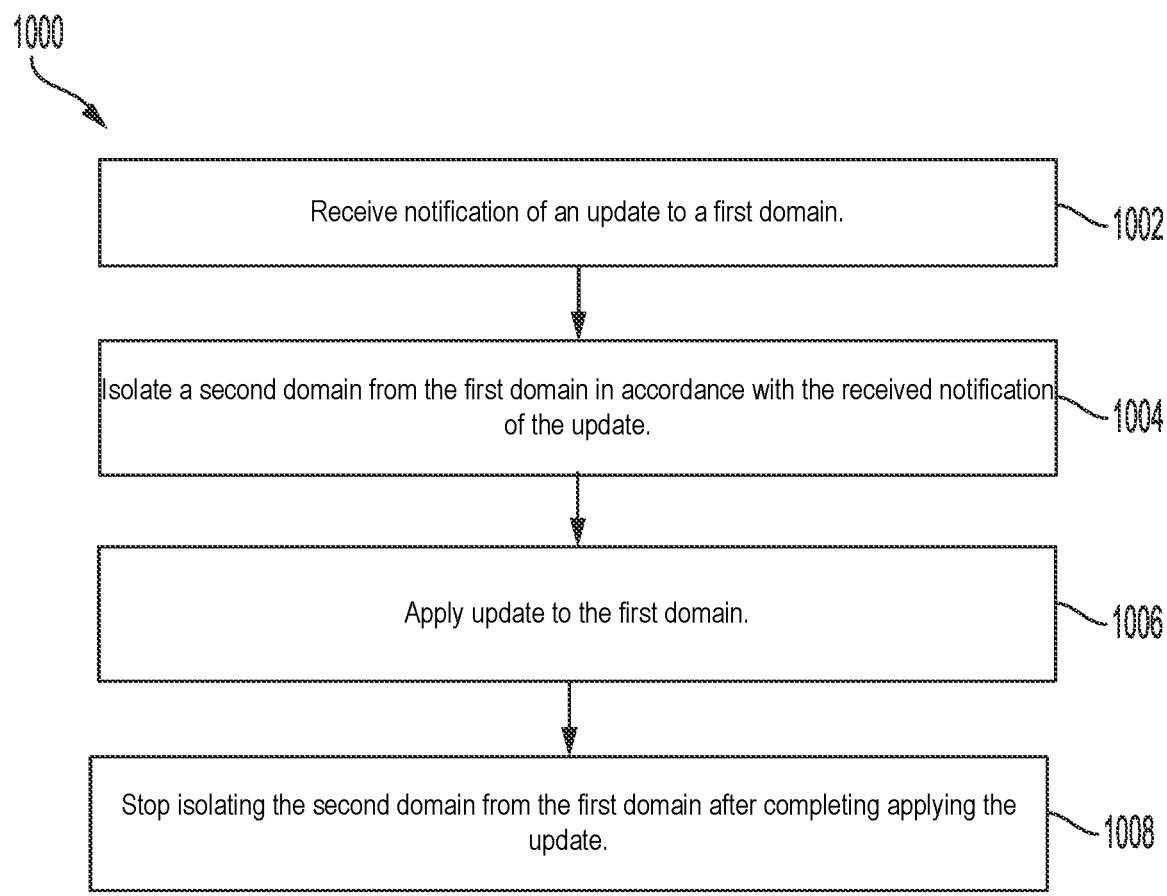
FIG. 10 is a flow chart illustrating an example method for isolation of a second domain of a automated driving SOC from a first domain of the automated driving SOC according to one or more aspects of the disclosure.

As discussed herein, isolation between domains may further facilitate continued operation of a domain of a SOC while another domain of the SOC is being updated. One method 1000 of domain isolation in an automotive SOC according to embodiments described above is shown in FIG. 10. The operations of a method 1000 may be performed along with one or more blocks of the method 800 or the method 900. FIG. 10 is a flow chart illustrating an example method for isolating a second domain of an SOC from a first domain of the SOC when a first domain of the SOC is being updated. The method 1000 includes, at block 1002, receiving a notification of an update to a first domain. For example, an automated driving SOC may receive a notification of an update to a first domain, such as a notification of an over the air update. The first domain may, for example, be a SAIL domain of an SOC. The SOC may further include a second domain, which may be an MD of the SOC. In some embodiments, the method 1000 may be performed by a processor of the second domain of the SOC.

At block 1004, a second domain, such as an MD, may be isolated from the first domain in accordance with the received notification of the update. For example, isolation logic between the second domain and the first domain may be activated. Such isolation may be performed in response to receipt of the notification of the update to the first domain. For example, the second domain may be isolated from the first domain while the update is being applied to the update to allow the second domain to function in a degraded mode while the update is being applied to the first domain.

At block 1006, the update may be applied to the first domain. For example, software or firmware of the first domain, which may be a SAIL domain, may be updated while the second domain is isolated from the first domain. Such updating may, for example, include rebooting the SAIL domain. While the update is being applied, the second domain may continue to operate. For example, the second domain may continue to operate in a degraded mode.

At block 1008, isolation between the second domain and the first domain may be stopped, after application of the update. For example, when updating the first domain is complete, isolation between the second domain and the first domain may be deactivated, as described herein. After the update to the first domain is completed, the second domain and first domain may proceed to communicate with each other via a shared mailbox and to operate in a mission mode. In some embodiments, after the update to the first domain is completed, the first domain may be reset or rebooted prior to resuming operation. Such a reset or reboot may include executing a BIST on the first domain, re-initialization of the domain and associated safety features and mechanisms, and activation of the first domain. The process of method 1000 described herein may be applied to update a SAIL domain or an MD, as the described first domain. Thus, in addition to facilitating continued operation of a first domain when an error is encountered by a second domain, isolation may facilitate application of an update to a first domain, while a second domain continued to function in a degraded mode.

It is noted that one or more blocks (or operations) described with reference to FIGS. 8, 9, and 10 may be combined with one or more blocks (or operations) described with reference to another of the figures. For example, one or more blocks (or operations) of FIG. 8 may be combined with one or more blocks (or operations) of FIG. 1-7. As another example, one or more blocks associated with FIG. 9 may be combined with one or more blocks associated with FIG. 6.

In one or more aspects, techniques for supporting vehicular operations may include additional aspects, such as any single aspect or any combination of aspects described below or in connection with one or more other processes or devices described elsewhere herein. In a first aspect, an apparatus may be configured to perform operations including detecting an error in a first domain of the automated driving system, wherein the automated driving system includes the processor, isolating a second domain of the automated driving system from the first domain, maintaining operation of the second domain of the automated driving system after isolating the second domain from the first domain, and bypassing, by the second domain, the first domain to transmit one or more notifications to an external controller via a first communication interface between the second domain and the external controller after isolating the second domain of the automated driving system from the first domain. In some implementations the apparatus may be a vehicle, or an automated driving system of a vehicle. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the apparatus is further configured to perform operations including transmitting a shutdown request to one or more power regulators after maintaining operation of the second domain of the automated driving system.

In a third aspect, in combination with one or more of the first aspect or the second aspect, the apparatus is further configured to perform operations including receiving a notification of an update to the first domain, isolate the second domain from the first domain in accordance with the received notification of the update, applying the update to the first domain, and stopping isolating the second domain from the first domain after completing applying the update.

In a fourth aspect, in combination with one or more of the first aspect through the third aspect, the first domain is configured according to a first safety integrity level and the second domain is configured according to a second safety integrity level, lower than the first safety integrity level.

In a fifth aspect, in combination with one or more of the first aspect through the fourth aspect, the first domain comprises a safety island domain and the second domain comprises a main domain.

In a sixth aspect, in combination with one or more of the first aspect through the fifth aspect, bypassing the first domain to transmit one or more notifications to the external controller via the first communication interface comprises transmitting, via the first communication interface, at least one of: an indication of a health of the second domain, an indication of one or more errors detected in the second domain, or a heartbeat check notification.

In a seventh aspect, in combination with one or more of the first aspect through the sixth aspect, maintaining operation of the second domain comprises at least one of: monitoring for one or more errors in the second domain, monitoring a voltage of one or more voltage rails associated with the second domain, monitoring a clock associated with the second domain, monitoring a temperature associated with the second domain, performing hardware diagnostics on the second domain, or performing software diagnostics on the second domain.

In an eighth aspect, in combination with one or more of the first aspect through the seventh aspect, the apparatus is further configured to perform operations comprising detecting that the error in the first domain has been resolved and stopping isolating the second domain of the automated driving system from the first domain in accordance with the resolution of the error.

In a ninth aspect, in combination with one or more of the first aspect through the seventh aspect, the first domain is located on a first die of a system on a chip (SOC) of the automated driving system and the second domain is located on a second die of the SOC of the automated driving system Components, the functional blocks, and the modules described herein with respect to FIGS. 1-4 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for isolation in an automated driving system, comprising:
   detecting an error in a first domain of the automated driving system;
   isolating a second domain of the automated driving system from the first domain, wherein the first domain is configured according to a first safety integrity level and the second domain is configured according to a second safety integrity level, having a lower level than the first safety integrity level;
   maintaining operation of the second domain of the automated driving system after isolating the second domain from the first domain; and
   bypassing, by the second domain, the first domain to transmit one or more notifications to an external controller via a first communication interface between the second domain and the external controller after isolating the second domain of the automated driving system from the first domain.

2. The method of claim 1, further comprising:
   transmitting a shutdown request to one or more power regulators after maintaining operation of the second domain of the automated driving system.

3. The method of claim 1, further comprising:
   stopping isolating the second domain from the first domain in response to a resolution of the error;
   receiving a notification of an update to the first domain after stopping isolating the second domain from the first domain in response to the resolution of the error;
   isolating the second domain from the first domain in accordance with the received notification of the update;
   applying the update to the first domain; and
   stopping isolating the second domain from the first domain after completing applying the update.

4. The method of claim 1, wherein the first domain comprises a safety island domain and the second domain comprises a main domain.

5. The method of claim 1, wherein bypassing the first domain to transmit one or more notifications to the external controller via the first communication interface comprises:
   transmitting, via the first communication interface, at least one of:
      an indication of a health of the second domain;
      an indication of one or more errors detected in the second domain; or
      a heartbeat check notification.

6. The method of claim 1, wherein maintaining operation of the second domain comprises at least one of:
   monitoring for one or more errors in the second domain;
   monitoring a voltage of one or more voltage rails associated with the second domain;
   monitoring a clock associated with the second domain;
   monitoring a temperature associated with the second domain;
   performing hardware diagnostics on the second domain; or
   performing software diagnostics on the second domain.

7. The method of claim 1, further comprising:
   detecting that the error in the first domain has been resolved; and
   stopping isolating the second domain of the automated driving system from the first domain in accordance with the resolution of the error.

8. The method of claim 1, wherein the first domain is located on a first die of a system on a chip (SOC) of the automated driving system and the second domain is located on a second die of the SOC of the automated driving system.

9. An automated driving system, comprising:
   a memory storing processor-readable code; and
   at least one processor coupled to the memory, the at least one processor configured to execute the processor-readable code to cause the at least one processor to perform operations including:
   detecting an error in a first domain of the automated driving system, wherein the automated driving system includes the processor;
   isolating a second domain of the automated driving system from the first domain, wherein the first domain is configured according to a first safety integrity level and the second domain is configured according to a second safety integrity level, having a lower level than the first safety integrity level;
   maintaining operation of the second domain of the automated driving system after isolating the second domain from the first domain; and
   bypassing, by the second domain, the first domain to transmit one or more notifications to an external controller via a first communication interface between the second domain and the external controller after isolating the second domain of the automated driving system from the first domain.

10. The apparatus of claim 9, wherein the at least one processor is further configured to execute the processor-readable code to cause the at least one processor to perform operations including:

transmitting a shutdown request to one or more power regulators after maintaining operation of the second domain of the automated driving system.

11. The apparatus of claim 9, wherein the at least one processor is further configured to execute the processor-readable code to cause the at least one processor to perform operations including:
stopping isolating the second domain from the first domain in response to a resolution of the error;
receiving a notification of an update to the first domain after stopping isolating the second domain from the first domain in response to the resolution of the error;
isolating the second domain from the first domain in accordance with the received notification of the update;
applying the update to the first domain; and
stopping isolating the second domain from the first domain after completing applying the update.

12. The apparatus of claim 9, wherein the first domain comprises a safety island domain and the second domain comprises a main domain.

13. The apparatus of claim 9, wherein bypassing the first domain to transmit one or more notifications to the external controller via the first communication interface comprises:
transmitting, via the first communication interface, at least one of:
an indication of a health of the second domain;
an indication of one or more errors detected in the second domain; or
a heartbeat check notification.

14. The apparatus of claim 9, wherein maintaining operation of the second domain comprises at least one of:
monitoring for one or more errors in the second domain;
monitoring a voltage of one or more voltage rails associated with the second domain;
monitoring a clock associated with the second domain;
monitoring a temperature associated with the second domain;
performing hardware diagnostics on the second domain; or
performing software diagnostics on the second domain.

15. The apparatus of claim 9, wherein the at least one processor is further configured to execute the processor-readable code to cause the at least one processor to perform operations including:
detecting that the error in the first domain has been resolved; and
stopping isolating the second domain of the automated driving system from the first domain in accordance with the resolution of the error.

16. The apparatus of claim 9, wherein the first domain is located on a first die of a system on a chip (SOC) of the automated driving system and the second domain is located on a second die of the SOC of the automated driving system.

17. A non-transitory computer-readable medium storing instructions that, when executed by a processor, cause the processor to perform operations comprising:
detecting an error in a first domain of an automated driving system, wherein the automated driving system includes the processor;
isolating a second domain of the automated driving system from the first domain, wherein the first domain is configured according to a first safety integrity level and the second domain is configured according to a second safety integrity level, having a lower level than the first safety integrity level;
maintaining operation of the second domain of the automated driving system after isolating the second domain from the first domain; and
bypassing, by the second domain, the first domain to transmit one or more notifications to an external controller via a first communication interface between the second domain and the external controller after isolating the second domain of the automated driving system from the first domain.

18. The non-transitory computer-readable medium of claim 17, further storing instructions that, when executed by a processor, cause the processor to perform operations comprising:
transmitting a shutdown request to one or more power regulators after maintaining operation of the second domain of the automated driving system.

19. The non-transitory computer-readable medium of claim 17, further storing instructions that, when executed by a processor, cause the processor to perform operations comprising:
stopping isolating the second domain from the first domain in response to a resolution of the error;
receiving a notification of an update to the first domain, after stopping isolating the second domain from the first domain in response to the resolution of the error;
isolating the second domain from the first domain in accordance with the received notification of the update;
applying the update to the first domain; and
stopping isolating the second domain from the first domain after completing applying the update.

20. The non-transitory computer-readable medium of claim 17, wherein the first domain comprises a safety island domain and the second domain comprises a main domain.

21. The non-transitory computer-readable medium of claim 17, wherein bypassing the first domain to transmit one or more notifications to the external controller via the first communication interface comprises:
transmitting, via the first communication interface, at least one of:
an indication of a health of the second domain;
an indication of one or more errors detected in the second domain; or
a heartbeat check notification.

22. The non-transitory computer-readable medium of claim 17, further storing instructions that, when executed by a processor, cause the processor to perform operations comprising:
detecting that the error in the first domain has been resolved; and
stopping isolating the second domain of the automated driving system from the first domain in accordance with the resolution of the error.

23. A vehicle, comprising:
an automated driving system including:
at least one processor, wherein at least one processor is configured to perform operations including:
detecting an error in a first domain of the automated driving system;
isolating a second domain of the automated driving system from the first domain, wherein the first domain is configured according to a first safety integrity level and the second domain is configured according to a second safety integrity level, having a lower level than the first safety integrity level;

maintaining operation of the second domain of the automated driving system after isolating the second domain from the first domain; and bypassing, by the second domain, the first domain to transmit one or more notifications to an external controller via a first communication interface between the second domain and the external controller after isolating the second domain of the automated driving system from the first domain.

24. The vehicle of claim 23, wherein the at least one processor is further configured to perform operations including:

transmitting a shutdown request to one or more power regulators of the driver assistance system after maintaining operation of the second domain of the automated driving system.

25. The vehicle of claim 23, wherein the first domain comprises a safety island domain and the second domain comprises a main domain.

26. The vehicle of claim 23, wherein the at least one processor is further configured to perform operations including:

stopping isolating the second domain from the first domain in response to a resolution of the error;

receiving a notification of an update to the first domain, after stopping isolating the second domain from the first domain in response to the resolution of the error;

isolating the second domain from the first domain in accordance with the received notification of the update;

applying the update to the first domain; and stopping isolating the second domain from the first domain after completing applying the update.

27. The vehicle of claim 23, wherein bypassing the first domain to transmit one or more notifications to the external controller via the first communication interface comprises:

transmitting, via the first communication interface, at least one of:

an indication of a health of the second domain;

an indication of one or more errors detected in the second domain; or a heartbeat check notification.

* * * * *